US012737442B2

(12) United States Patent
Dange et al.

(10) Patent No.: US 12,737,442 B2
(45) Date of Patent: Sep. 15, 2026

(54) SYSTEM AND METHOD FOR CREATING AND MANAGING INTERACTIVE TRANSACTION FRAMEWORKS

(71) Applicant: Amod Ashok Dange, Mountain View, CA (US)

(72) Inventors: Amod Ashok Dange, Mountain View, CA (US); Yash Mody, Mumbai (IN)

( * ) Notice: Subject to any disclaimer, the term of this patent is extended or adjusted under 35 U.S.C. 154(b) by 54 days.

(21) Appl. No.: 19/050,175

(22) Filed: Feb. 11, 2025

(65) Prior Publication Data

US 2025/0182120 A1 Jun. 5, 2025

Related U.S. Application Data

(63) Continuation-in-part of application No. 18/782,801, filed on Jul. 24, 2024, now Pat. No. 12,603,780, (Continued)

(51) Int. Cl.
*G06Q 20/40* (2012.01)
*G06F 16/21* (2019.01)
(Continued)

(52) U.S. Cl.
CPC ..... *G06Q 20/40145* (2013.01); *G06F 16/213* (2019.01); *G06F 16/2379* (2019.01); (Continued)

(58) Field of Classification Search
CPC ......... G06Q 20/40145; G06Q 30/0202; G06Q 2220/00; G06Q 10/105; G06Q 10/48; (Continued)

(56) References Cited

U.S. PATENT DOCUMENTS 6,950,824 B1 * 9/2005 Babiskin ............. G06F 21/6227 707/999.1
7,013,290 B2 3/2006 Ananian
(Continued)

FOREIGN PATENT DOCUMENTS

JP 2014127164 A 7/2014

OTHER PUBLICATIONS

Sy et al. “Generation of Cryptographic Keys from Personal Biometrics: An Illustration Based on Fingerprints.” dated Nov. 28, 2012, pp. 1-35.
(Continued)

*Primary Examiner* — Cheng-Feng Huang
(74) *Attorney, Agent, or Firm* — Kevin J Fournier IP Legal Services Ltd; Kevin J Fournier

(57) ABSTRACT

A System for providing Interactive Transaction Frameworks, utilizing biometric authentication and semantic web technologies is disclosed. The system registers users with a unique biometric-based identifier, and employs ontologies, schemas, and knowledge graphs to create a semantic foundation. A Large Language Model integrated with the Knowledge Graph Module enables intelligent processing of Interactive Transaction data. The system composes Interactive Transactions with fields mapped to semantic triples, maintains them in an Interactive Transaction Library, and manages user permissions. A Transaction Publishing Platform facilitates Interactive Transaction distribution and submission-response cycles. The system refines inputs and responses, determining outcomes based on these interactions. The system offers a sophisticated, secure, and adaptable approach to Interactive Transaction management and processing across various domains.

16 Claims, 11 Drawing Sheets

Related U.S. Application Data which is a continuation-in-part of application No. 17/481,468, filed on Sep. 22, 2021, now Pat. No. 12,072,963, which is a continuation-in-part of application No. 17/018,273, filed on Sep. 11, 2020, now Pat. No. 11,582,032.

(60) Provisional application No. 63/029,717, filed on May 26, 2020, provisional application No. 62/954,591, filed on Dec. 29, 2019, provisional application No. 62/906,080, filed on Sep. 25, 2019.

(51) Int. Cl.
*G06F 16/23* (2019.01)
*G06F 16/242* (2019.01)
*G06F 16/901* (2019.01)
*G06Q 30/0202* (2023.01)
*H04L 9/08* (2006.01)

(52) U.S. Cl.
CPC ........ *G06F 16/243* (2019.01); *G06F 16/9024* (2019.01); *G06Q 30/0202* (2013.01); *H04L 9/0866* (2013.01); *H04L 9/0869* (2013.01)

(58) Field of Classification Search
CPC .............. G06Q 30/0185; G06Q 50/265; G06F 16/213; G06F 16/2379; G06F 16/243; G06F 16/9024; G06F 21/32; H04L 9/0866; H04L 9/0869; H04L 9/30; H04L 9/3213; H04L 9/3247; H04L 63/0861; H04L 63/104
See application file for complete search history.

(56) References Cited

U.S. PATENT DOCUMENTS 7,340,438 B2 3/2008 Nordman et al.
7,496,191 B1 2/2009 Crews et al.
7,769,633 B2 8/2010 Jokinen et al.
8,170,615 B2 5/2012 Vanska et al.
9,633,269 B2 4/2017 Gu et al.
10,136,191 B1 11/2018 Lewis et al.
10,489,826 B2 11/2019 Matthews et al.
10,530,577 B1 1/2020 Pazhoor et al.
11,252,479 B2 2/2022 Lewis et al.
2002/0023220 A1* 2/2002 Kaplan ................ H04L 9/3247 713/176
2003/0028451 A1* 2/2003 Ananian ............ G06Q 30/0615 705/26.42
2003/0135740 A1* 7/2003 Talmor ................. H04L 9/3231 713/186
2006/0085844 A1* 4/2006 Buer .................... H04L 9/3263 726/4
2007/0271463 A1* 11/2007 Ginter ............. H04N 21/25875 713/176
2008/0072068 A1 3/2008 Wang et al.
2008/0281726 A1* 11/2008 Gupta .................... G06Q 10/40 705/26.1
2009/0192873 A1* 7/2009 Marble .................. G06Q 20/10 705/14.1
2009/0271634 A1 10/2009 Boult et al.
2012/0033807 A1* 2/2012 Asim ................... G06F 21/606 380/44
2014/0006290 A1 1/2014 Hozanne et al.
2015/0006895 A1* 1/2015 Irvine ................ G06F 21/6209 713/171
2015/0046699 A1* 2/2015 Benteo ................... G06F 21/35 713/155
2015/0095999 A1 4/2015 Toth
2015/0134552 A1 5/2015 Engels et al.
2015/0269389 A1* 9/2015 Lee .................... H04L 63/0428 726/5
2015/0280921 A1 10/2015 Geoffrey
2016/0050213 A1* 2/2016 Storr ........................ H04L 9/32 726/6
2016/0219046 A1 7/2016 Ballard et al.
2017/0141920 A1* 5/2017 Herder, III ................ H04L 9/30
2017/0372059 A1 12/2017 Sindia et al.
2018/0173871 A1 6/2018 Toth
2018/0307859 A1 10/2018 LaFever et al.
2019/0097812 A1 3/2019 Toth et al.
2019/0182176 A1 6/2019 Niewczas
2019/0306151 A1 10/2019 Hamel et al.
2020/0204545 A1 6/2020 Pacella et al.
2020/0266989 A1 8/2020 KrcMaricic-Barackov et al.
2020/0296093 A1 9/2020 Hoyos
2021/0058246 A1* 2/2021 Stolbikov ............ H04L 9/0841
2021/0091937 A1 3/2021 Dange et al.
2022/0004613 A1 1/2022 Dange et al.
2022/0004619 A1 1/2022 Dange et al.
2022/0004661 A1 1/2022 Dange et al.
2022/0006815 A1 1/2022 Dange et al.
2022/0038291 A1* 2/2022 Hong ................... H04L 9/3231

OTHER PUBLICATIONS

Hochrieser, "Online Dating Can Benefit From Identity Verification And Biometric Authentication In 2019", Information Security Buzz, dated Jul. 18, 2019 pp. 1-5.
Arsenova, "Face Liveness Detection For Safe Biometric Authentication And Face Recognition", dated Jan. 27, 2020, pp. 1-10.
M. Kapko et al., "What is Windows Hello? Microsoft's biometrics security system explained" dated Jan. 12, 2021, pp. 1-5.
Mjaaland et al., "Biocryptics: Towards Robust Biometric Public/Private Key Generation", The Norwegian Information Security Conference (NISK) dated 2009, pp. 27-42.
Chandra et al., "Generate an Encryption Key by using Biometric Cryptosystems to secure transferring of Data over a Network", IOSR Journal of Computer Engineering (IOSR-JCE), vol. 12, Issue 1, dated May-Jun. 2013), pp. 1-11.

* cited by examiner

SYSTEM AND METHOD FOR CREATING AND MANAGING INTERACTIVE TRANSACTION FRAMEWORKS

CROSS-REFERENCE TO RELATED APPLICATIONS AND PRIORITY

The present application is a Continuation in Part (CIP) application of U.S. Complete application Ser. No. 18/782,801, filed on Jul. 24, 2024 entitled "System and method for managing an operating system using tokenized identity", which claims priority from and is a CIP of U.S. Complete application Ser. No. 17/481,468, filed on Sep. 22, 2021 entitled "System and method for affixing a signature using biometric authentication", which claims priority from and is a CIP of US Complete application Ser. No. 17/018,273 filed on Sep. 11, 2020 entitled "System and method for sharing user preferences without having the user reveal their identity", which claims the benefit of U.S. Provisional Application No. 62/906,080 filed on Sep. 25, 2019 entitled "Method and system of managing personal and business information", the U.S. Provisional Application No. 62/954,591 filed on Dec. 29, 2019 entitled "Method and system for anonymously matching consumers and businesses", and also the U.S. Provisional Application No. 63/029,717 filed on May 26, 2020 entitled "Method and system of storing identity and signature using the human body as a node."

TECHNICAL FIELD

The present subject matter described herein, in general, relates to a system and a method for Interactive Transaction Framework management and processing. More specifically, the present subject matter relates to a system and method for creating, managing, and processing Interactive Transactions using ontology-based knowledge representation, biometric authentication, and tokenized identity management.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

In the digital age, forms remain a ubiquitous and essential tool for data collection and processing across various sectors. However, the current paradigm of form management and submission presents numerous challenges. Users often find the process of locating, filling out, and submitting forms to be tedious, time-consuming, and prone to errors. The proliferation of online services and mobile computing has exacerbated these issues, as users are now expected to interact with an increasing number of forms across multiple platforms and devices.

Traditional form systems suffer from several critical shortcomings. Firstly, users frequently struggle to locate the correct form and its appropriate version, leading to confusion and potential submission of outdated or incorrect information. Secondly, the authenticity of forms is often difficult to verify, raising concerns about security and data integrity. Thirdly, the manual input required by most forms is not only time-consuming but also increases the likelihood of errors and inconsistencies in submitted data.

Furthermore, the current form submission process lacks transparency and user control. Once a form is submitted, users typically have limited visibility into its status and must rely on the recipient to provide updates, often through separate communication channels. This disconnect between submission and status tracking can lead to inefficiencies and frustration for both submitters and processors.

Another significant issue lies in the authentication of form submissions. Many forms still rely on hand-drawn signatures for verification, a method that is inherently difficult to authenticate due to the lack of a reliable source of truth. This outdated approach to identity verification poses security risks and can lead to disputes over the validity of submitted forms.

The challenges extend to the underlying systems that manage forms and user data. Form management platforms often require extensive user information, raising concerns about data privacy and security. The providers of these systems bear a significant burden in safeguarding user accounts and sensitive information from potential breaches and unauthorized access.

Thus, users have long felt the need for a comprehensive solution that addresses these multifaceted challenges in form management and submission. Such a solution should streamline the process of finding and filling out forms, ensure the authenticity and security of submissions, provide transparent status tracking, and incorporate robust identity verification mechanisms. Additionally, it should respect user privacy, offer personalized services, and enable secure management of forms across multiple devices and contexts. The present invention aims to address these long-standing needs and provide innovative solutions to the aforementioned issues in the realm of Interactive Transactions management and processing.

SUMMARY

This summary is provided to introduce concepts related to a system and for providing Interactive Transaction Frameworks, which are further described below in the detailed description. This summary is not intended to identify essential features of the claimed subject matter nor is it intended for use in determining or limiting the scope of the claimed subject matter.

In one implementation, a system for providing Interactive Transaction Frameworks is disclosed. The system comprises a processor and a memory coupled to the processor. The processor is configured to execute programmed instructions stored in the memory for registering each user from a set of users, wherein the set of users comprises one or more Publisher-Users and one or more Submitter-Users. The user registration process for each user comprises steps of receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, and storing the Public-Key (P1) as a base identifier of the user, in a people registry. Further, the processor is configured to execute programmed instructions stored in the memory for defining, by an Ontology Module, one or more ontologies based on inputs received from developer users.

Further, the processor is configured to execute programmed instructions stored in the memory for building, by a Schema Module, one or more schemas based on the one or more ontologies, developing, by a Graph Database Module, one or more graph databases using the one or more schemas, and generating, by a Knowledge Graph Module, one or more knowledge graphs using the one or more graph databases and the one or more ontologies, wherein the Knowledge Graph Module is comprised of a set of knowledge graphs, wherein each knowledge graph, from the set of knowledge graphs, contains a set of RDF triple stores, wherein each RDF triplestore contains a set of RDF triples. The Knowledge Graph Module is integrated with a Large Language Model and is configured for receiving training data into the Large Language Model, translating, by the Large Language Model, the training data into a set of semantic (RDF) triples, generating, by the Large Language Model, RDF queries based on the set of semantic (RDF) triples, validating, by the Semantic Reasoner Module, the internal logic of the set of semantic (RDF) triples, executing a first query to traverse across one or more triple stores, obtaining results of the first query, applying the results to formulate a second query, executing the second query to traverse across one or more triple stores, and creating a feedback loop of cascading queries and results spanning all accessible Knowledge Graphs, thereby generating a completely normalized and consistent set of Knowledge Graphs.

Further, the processor is configured to execute programmed instructions stored in the memory for building, by a Preference Store Module, a preference store comprised of preferences in respect of each user from the set of users, wherein the preferences are stored in the form of RDF triples based on the one or more ontologies and the one or more schemas, authenticating the one or more Publisher-Users and the one or more Submitter-Users based on a user authentication process. The user authentication process comprises receiving a biometric sample captured from the user in real-time, processing the biometric sample to generate a Secret-Key (S2), fetching the Public-Key (P1) corresponding to the user from the user device based on the base identifier, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored on the user device.

Further, the processor is configured to execute programmed instructions stored in the memory for composing, by a Transaction Composer Module, a set of Interactive Transactions based on Transaction fields received from the one or more Publisher-Users, wherein the set of Interactive Transactions is comprised of one or more selectable input Transaction fields and optionally one or more free text input Transaction fields, wherein each of the one or more selectable input Transaction fields and optionally one or more free text input Transaction fields is mapped to the one or more semantic triples based on the one or more ontologies and the one or more schemas, maintaining, by a Transaction Library Module, the set of Interactive Transactions, setting, by a Permission Module, one or more user permissions corresponding to each of the set of Interactive Transactions based on inputs received from the one or more Publisher-Users, and publishing, on a Transaction Publishing Platform, the set of Interactive Transactions. Further, the processor is configured to execute programmed instructions stored in the memory for providing an interface for recording one or more submission-response cycles, wherein each submission-response cycle comprises receiving from the one or more Submitter-Users, one or more inputs corresponding to the one or more selectable input fields or the one or more free text input fields corresponding to a Target Interactive Transaction, refining, by a Refining Module, the one or more inputs, publishing, on the Transaction Publishing Platform, the one or more inputs, receiving from the one or more Publisher-Users, one or more responses corresponding to the one or more inputs received from the one or more Submitter-Users, refining, by a Refining Module, the one or more responses and publishing, on the Transaction Publishing Platform, the one or more responses.

Further, the processor is configured to execute programmed instructions stored in the memory for determining an outcome based on the one or more submission-response cycles and publishing the outcome on the Transaction Publishing Platform.

In another implementation, a method for providing Interactive Transaction Frameworks is disclosed. The method comprises steps for registering each user from a set of users, wherein the set of users comprises one or more Publisher-Users and one or more Submitter-Users. The user registration process for each user comprises steps of receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, and storing the Public-Key (P1) as a base identifier of the user, in a people registry. Further, the processor is configured to execute programmed instructions stored in the memory for defining, by an Ontology Module, one or more ontologies based on inputs received from developer users.

Further, the method comprises steps for building, by a Schema Module, one or more schemas based on the one or more ontologies, developing, by a Graph Database Module, one or more graph databases using the one or more schemas, and generating, by a Knowledge Graph Module, one or more knowledge graphs using the one or more graph databases and the one or more ontologies, wherein the Knowledge Graph Module is comprised of a set of knowledge graphs, wherein each knowledge graph, from the set of knowledge graphs, contains a set of RDF triple stores, wherein each RDF triplestore contains a set of RDF triples. The Knowledge Graph Module is integrated with a Large Language Model and is configured for receiving training data into the Large Language Model, translating, by the Large Language Model, the training data into a set of semantic (RDF) triples, generating, by the Large Language Model, RDF queries based on the set of semantic (RDF) triples, validating, by the Semantic Reasoner Module, the internal logic of the set of semantic (RDF) triples, executing a first query to traverse across one or more triple stores, obtaining results of the first query, applying the results to formulate a second query, executing the second query to traverse across one or more triple stores, and creating a feedback loop of cascading queries and results spanning all accessible Knowledge Graphs, thereby generating a completely normalized and consistent set of Knowledge Graphs.

Further, the method comprises steps for building, by a Preference Store Module, a preference store comprised of preferences in respect of each user from the set of users, wherein the preferences are stored in the form of RDF triples based on the one or more ontologies and the one or more schemas, authenticating the one or more Publisher-Users and the one or more Submitter-Users based on a user authentication process. The user authentication process comprises receiving a biometric sample captured from the user in real-time, processing the biometric sample to generate a Secret-Key (S2), fetching the Public-Key (P1) corresponding to the user from the user device based on the base identifier, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored on the user device.

Further, the method comprises steps for composing, by a Transaction Composer Module, a set of Interactive Transactions based on Transaction fields received from the one or more Publisher-Users, wherein the set of Interactive Transactions is comprised of one or more selectable input Transaction fields and optionally one or more free text input Transaction fields, wherein each of the one or more selectable input Transaction fields and optionally one or more free text input Transaction fields is mapped to the one or more semantic triples based on the one or more ontologies and the one or more schemas, maintaining, by a Transaction Library Module, the set of Interactive Transactions, setting, by a Permission Module, one or more user permissions corresponding to each of the set of Interactive Transactions based on inputs received from the one or more Publisher-Users, and publishing, on a Transaction Publishing Platform, the set of Interactive Transactions. Further, the processor is configured to execute programmed instructions stored in the memory for providing an interface for recording one or more submission-response cycles, wherein each submission-response cycle comprises receiving from the one or more Submitter-Users, one or more inputs corresponding to the one or more selectable input fields or the one or more free text input fields corresponding to a Target Interactive Transaction, refining, by a Refining Module, the one or more inputs, publishing, on the Transaction Publishing Platform, the one or more inputs, receiving from the one or more Publisher-Users, one or more responses corresponding to the one or more inputs received from the one or more Submitter-Users, refining, by a Refining Module, the one or more responses and publishing, on the Transaction Publishing Platform, the one or more responses.

Further, the method comprises steps for determining an outcome based on the one or more submission-response cycles and publishing the outcome on the Transaction Publishing Platform.

In yet another implementation, a non-transitory computer-readable storage medium storing a computer program product is disclosed. The computer program product comprises computer-executable instructions for providing Interactive Transaction Frameworks, which when executed by one or more processors, cause the one or more processors to perform the steps of registering each user from a set of users, wherein the set of users comprises one or more Publisher-Users and one or more Submitter-Users. The user registration process for each user comprises steps of receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, and storing the Public-Key (P1) as a base identifier of the user, in a people registry. Further, the processor is configured to execute programmed instructions stored in the memory for defining, by an Ontology Module, one or more ontologies based on inputs received from developer users.

Further, the computer program product comprises computer-executable instructions for building, by a Schema Module, one or more schemas based on the one or more ontologies, developing, by a Graph Database Module, one or more graph databases using the one or more schemas, and generating, by a Knowledge Graph Module, one or more knowledge graphs using the one or more graph databases and the one or more ontologies, wherein the Knowledge Graph Module is comprised of a set of knowledge graphs, wherein each knowledge graph, from the set of knowledge graphs, contains a set of RDF triple stores, wherein each RDF triplestore contains a set of RDF triples. The Knowledge Graph Module is integrated with a Large Language Model and is configured for receiving training data into the Large Language Model, translating, by the Large Language Model, the training data into a set of semantic (RDF) triples, generating, by the Large Language Model, RDF queries based on the set of semantic (RDF) triples, validating, by the Semantic Reasoner Module, the internal logic of the set of semantic (RDF) triples, executing a first query to traverse across one or more triple stores, obtaining results of the first query, applying the results to formulate a second query, executing the second query to traverse across one or more triple stores, and creating a feedback loop of cascading queries and results spanning all accessible Knowledge Graphs, thereby generating a completely normalized and consistent set of Knowledge Graphs.

Further, the computer program product comprises computer-executable instructions for building, by a Preference Store Module, a preference store comprised of preferences in respect of each user from the set of users, wherein the preferences are stored in the form of RDF triples based on the one or more ontologies and the one or more schemas, authenticating the one or more Publisher-Users and the one or more Submitter-Users based on a user authentication process. The user authentication process comprises receiving a biometric sample captured from the user in real-time, processing the biometric sample to generate a Secret-Key (S2), fetching the Public-Key (P1) corresponding to the user from the user device based on the base identifier, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored on the user device.

Further, the computer program product comprises computer-executable instructions for composing, by a Transaction Composer Module, a set of Interactive Transactions based on Transaction fields received from the one or more Publisher-Users, wherein the set of Interactive Transactions is comprised of one or more selectable input Transaction fields and optionally one or more free text input Transaction fields, wherein each of the one or more selectable input Transaction fields and optionally one or more free text input Transaction fields is mapped to the one or more semantic triples based on the one or more ontologies and the one or more schemas, maintaining, by a Transaction Library Module, the set of Interactive Transactions, setting, by a Permission Module, one or more user permissions corresponding to each of the set of Interactive Transactions based on inputs received from the one or more Publisher-Users, and publishing, on a Transaction Publishing Platform, the set of Interactive Transactions. Further, the processor is configured to execute programmed instructions stored in the memory for providing an interface for recording one or more submission-response cycles, wherein each submission-response cycle comprises receiving from the one or more Submitter-Users, one or more inputs corresponding to the one or more selectable input fields or the one or more free text input fields corresponding to a Target Interactive Transaction, refining, by a Refining Module, the one or more inputs, publishing, on the Transaction Publishing Platform, the one or more inputs, receiving from the one or more Publisher-Users, one or more responses corresponding to the one or more inputs received from the one or more Submitter-Users, refining, by a Refining Module, the one or more responses and publishing, on the Transaction Publishing Platform, the one or more responses.

Further, the computer program product comprises computer-executable instructions for determining an outcome based on the one or more submission-response cycles and publishing the outcome on the Transaction Publishing Platform.

DEFINITIONS

'Universal Transaction ID' refers to a unique identifier assigned to each Interactive Transaction within the system, enabling efficient tracking and management of forms across the platform.

'Peer-to-peer network storage' refers to a decentralized method of storing Interactive Transaction data across multiple user devices, enhancing data resilience and accessibility.

'Interactive Transaction status settings' refers to configurable options that indicate the current state of an Interactive Transaction, such as draft, pending, or approved, within the Interactive Transaction lifecycle.

'Current user's SelfKey based anonymous Universal Unique User ID' refers to a unique identifier generated from a user's biometric data, ensuring anonymity while maintaining a consistent identity across the system. It must be noted that although "face" is a biometric modality in this example, any other modality may be used, such as "fingerprint key", "voice key" and so on.

'List of SelfKey-based anonymous Universal Unique User IDs with Interactive Transaction permissions' refers to a collection of user identifiers associated with specific access rights for each Interactive Transaction.

'Graph Database' refers to a database that uses graph structures with nodes, edges, and properties to represent and store data.

'JSON parameters' refers to data structures used to define and configure various aspects of Interactive Transactions in a format that is both human-readable and machine-parsable.

'API endpoints' refers to specific URLs that accept web service requests and serve as connection points for accessing various functionalities of the system.

'Rules composer' refers to a tool within the system that allows users to create and manage logical conditions and actions that govern Interactive Transaction behavior and data validation.

'Configurable workflow actions' refers to customizable sequences of operations that can be defined to automate processes within the system.

'Semantic document reader' refers to a component that interprets and extracts meaningful information from structured documents, understanding their context and content.

'OCR document reader' refers to a tool that uses Optical Character Recognition technology to convert images of text into machine-encoded text, facilitating the import of data from physical documents.

'Large Language Model' refers to an advanced AI model capable of understanding and generating human-like text, used for natural language processing tasks within the system.

'Parametric evaluation settings' refers to configurable criteria used to assess and analyze Interactive Transaction inputs based on predefined parameters.

'Attachment links' refers to mechanisms for associating external files or documents with specific Interactive Transactions or Transaction fields.

'Topic tags' refers to labels used to categorize and organize Interactive Transactions based on their subject matter or purpose.

'RDF Triple store' refers to a specialized database for the storage and retrieval of triples, which are data entities composed of subject-predicate-object.

'Knowledge Graph' refers to a network of entities, their properties, and the relationships between them, used to represent and organize complex information within the system.

'Contextual links' refers to hyperlinks or references that provide additional, context-specific information relevant to particular Transaction fields or topics.

'Endorsement settings' refers to configurable options that allow users to support or verify information provided by other users within the system.

'Referral settings' refers to options that enable users to recommend or direct other users to specific Interactive Transactions or system features.

'@mention settings' refers to configuration options for a feature that allows users to reference or notify other users within the system using their unique identifiers.

'Fee calculator' refers to a tool within the system that computes charges or costs associated with specific Interactive Transaction submissions or processes.

'SelfKey signature' refers to a biometric-based digital signature that uses facial recognition data to verify the identity of a user signing a form.

'SelfKey based secure access' refers to a method of authenticating users and granting system access based on facial recognition technology.

'Multi-signature settings' refers to options for configuring workflows that require approval or signature from multiple users, either in sequence or simultaneously.

'Appointment tool settings' refers to configuration options for scheduling and managing meetings or time slots within the system.

'Validator settings' refers to configurable rules and conditions used to check the accuracy, completeness, and consistency of data entered into Interactive Transactions.

'Draft settings' refers to options that allow users to save incomplete forms and continue working on them at a later time.

'Notification settings' refers to configurable options for alerting users about form-related events, updates, or required actions.

'Configurable commenting permissions' refers to settings that control who can add, view, or respond to comments on Interactive Transactions.

'Emoticon settings' refers to options for enabling and customizing the use of emotion-expressing icons within the system.

'Sharing settings' refers to configurable options that determine how and with whom Interactive Transactions can be shared within the system.

'Feedback settings' refers to options for configuring how users can provide and receive input on the quality or effectiveness of Interactive Transactions.

'Comparative data analytics' refers to tools and features that allow users to analyze and compare data across multiple Interactive Transactions or time periods.

'Time-series data analytics' refers to capabilities within the system for analyzing and visualizing data that changes over time, extracted from Interactive Transactions.

'GIF' refers to a Graphics Interchange Format, which is a digital file format used for sharing animated images within the Interactive Transaction system.

'Expressive elements' refers to digital content components that users can employ to convey emotions, reactions, or sentiments within Interactive Transactions, including but not limited to emoticons, animated images (GIFs), stickers, and other visual or symbolic representations designed to enhance communication.

'Identity token' refers to a unique digital identifier generated by the system to represent a user's identity in a secure and anonymous manner during Interactive Transaction processes, allowing for authenticated interactions while preserving user privacy. The identity token is derived from the user's Public-Key and is used to track user actions within the system without exposing the user's actual identity or biometric information.

BRIEF DESCRIPTION OF DRAWINGS

The detailed description is described with reference to the accompanying Figures. The same numbers are used throughout the drawings to refer to features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
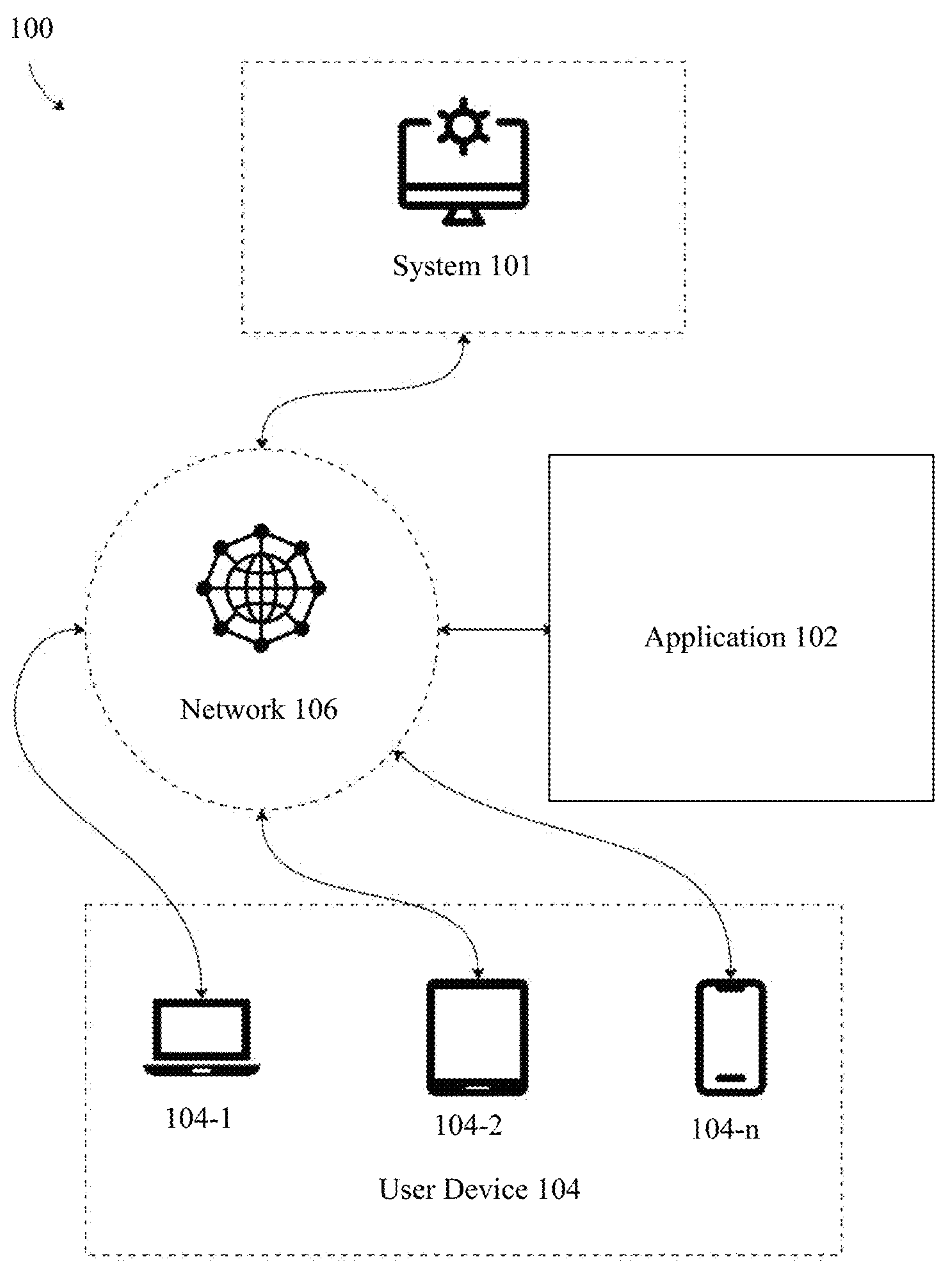
FIG. 1 illustrates a network implementation 100 of a system 101 for providing Interactive Transaction Frameworks using tokenized identity and biometric authentication, in accordance with an embodiment of the present disclosure.

Referring now to FIG. 1, implementation 100 of system 101 for providing Interactive Transaction Frameworks is illustrated, in accordance with an embodiment of the present subject matter. In one embodiment, the system 101 may comprise a processor and a memory. Further, the system 101 may be connected to user devices and Applications through a network 104. It may be understood that the system 101 may be communicatively coupled with multiple users through one or more User devices 103-1, 103-2, 103-3 . . . , **103-*n* and Applications 102-1, 102-2, 102-3 . . . , 102-*n* collectively referred to as a user device 103 and Applications 102**.

In one embodiment, the network 104 may be a cellular communication network used by user devices 103 such as mobile phones, tablets, or a virtual device. In one embodiment, the cellular communication network may be the Internet. The user device 103 may be any electronic device, communication device, image capturing device, machine, software, automated computer program, a robot or a combination thereof. Further the Application 102 may be any employee recruitment platform, networking platform, media platform, messaging platform, ecommerce platform, or any other application platform. The system 101 may be configured to register users over the system 101. Further, the system may be configured to authenticate the user, each time the user makes a request to access the system 101.

In one embodiment, the user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the user devices 103 are enabled with biometric scanning capabilities. Further, the Application 102 may be a thin client application. In one embodiment, system 101 is designed to provide Interactive Transactions functionality, incorporating advanced features such as tokenized identity, biometric authentication, and knowledge graph integration. The system 101 facilitates interaction between publishers and submitters, allowing for the creation, submission, and processing of Interactive Transactions.

The system 101 includes various modules for handling different aspects of the Interactive Transactions process, including user registration, Interactive Transaction composition, Interactive Transaction library management, and permissions handling. The system 101 also incorporates advanced technologies such as ontology-based schemas, graph databases, and large language models to enhance Interactive Transaction processing and data analysis.

The user registration and authentication processes are designed to ensure secure access to the system, utilizing biometric data and encryption techniques. This allows for a robust and secure environment for handling potentially sensitive Interactive Transaction data. Overall, the system 101 aims to provide a comprehensive solution for Interactive Transaction management, combining security, flexibility, and advanced data processing capabilities. The specific details of the registration process, Interactive Transaction composition, and other key features will be further elaborated in the description of subsequent figures. The user registration process is further illustrated with the block diagram in FIG. 2.

Figure 2:
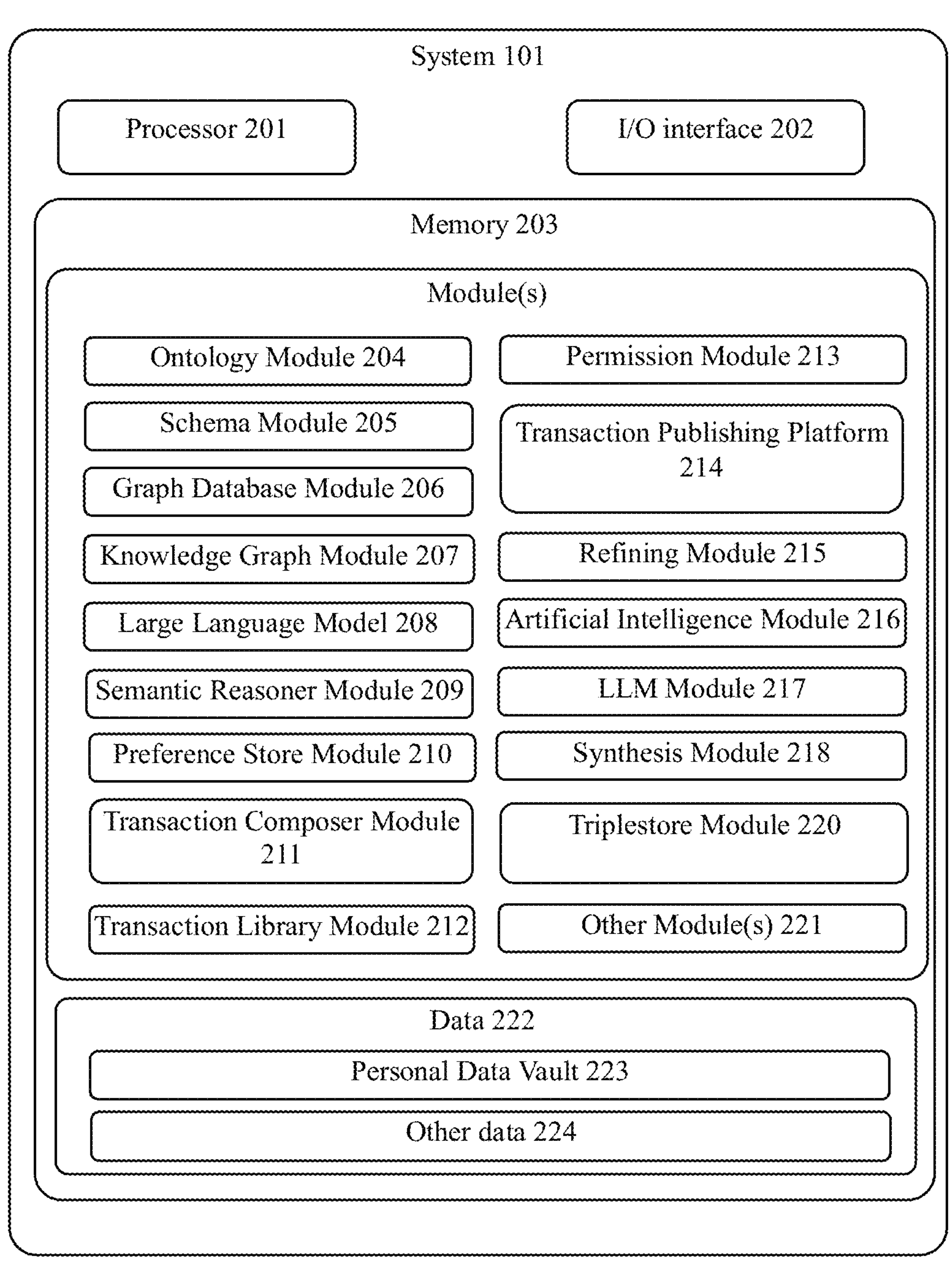
FIG. 2 illustrates components of the system 101 for providing the Interactive Transaction Frameworks, in accordance with an embodiment of the present disclosure.

Referring now to FIG. 2, various components of the System 101 are illustrated, in accordance with an embodiment of the present subject matter. As shown, the system 101 may include at least one processor 201, an I/O Interface 202 and a memory 203. The memory 203 consists of a set of modules. The set of modules may include an Ontology Module 204, a Schema Module 205, a Graph Database Module 206, a Knowledge Graph Module 207, a Large Language Model 208, a Semantic Reasoner Module 209, a Preference Store Module 210, a Transaction Composer Module 211, a Transaction Library Module 212, a Permission Module 213, a Transaction Publishing Platform 214, a Refining Module 215, an Artificial Intelligence Module 216, a Large Language Model (LLM) Module 217, a Synthesis Module 218, a Triple store Module 220, and other modules 221. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions may include routines, programs, objects, components, data structures, etc., which perform particular tasks, functions, or implement particular abstract data types. The data 222 may comprise a Personal Data Vault 223, and other data 224. The Personal Data Vault 223 is configured to maintain a user token, a Unique-Number, and a Public-Key corresponding to each user from a set of users, including both Publisher-Users and Submitter-Users. The Personal Data Vault 223 may be hosted on a centralized server, ensuring secure and controlled access to this critical information. The other data 224, amongst other things, serves as a repository for storing data processed, received, and generated by one or more components and programmed instructions.

In one embodiment, the processor 201 may be configured for executing programmed instructions for registering each user from a set of users. The processor 201 may be configured to perform several key functions in the user registration process.

Initially, the processor 201 receives a set of biometric samples from the user. These samples correspond to one or more biometric factors, which could include facial features, iris patterns, fingerprints, or other unique biological characteristics. The module then processes this set of biometric samples to compute a Secret-Key (S1) that corresponds uniquely to the user. This Secret-Key (S1) serves as a fundamental element of the user's secure identity within the system 101.

Following the creation of the Secret-Key (S1), the processor 201 generates a Unique-Number (N1) using a random number generation algorithm. This step adds an additional layer of security and uniqueness to the user's profile. The processor 201 then applies a specialized Function (F1) to both the Secret-Key (S1) and the Unique-Number (N1) to compute a Public-Key (P1). It's important to note that this Function (F1) is based on Asymmetric Key Encryption principles. The function consumes both the Secret-Key (S1) and the Unique-Number (N1) as inputs to compute the Public-Key (P1). A critical aspect of this process is that the resulting Public-Key (P1) is distinct from the Secret-Key (S1), ensuring the security of the user's private information. The Function (F1) may implement Asymmetric Key Encryption specifically using elliptic curve cryptography (ECC). During the encryption process, Function (F1) uses the Secret-Key (S1) as the private key input and combines it with the Unique-Number (N1) through point multiplication on the selected elliptic curve. The Secret-Key (S1) serves as the scalar multiplier while the Unique-Number (N1) is used to derive the base point on the curve. This multiplication operation results in a point on the curve that becomes the Public-Key (P1). Due to the one-way nature of ECC, even with knowledge of P1 and N1, it remains computationally infeasible to derive S1, thereby maintaining the security of the biometric-derived secret key while enabling reliable authentication through the derived public key.

In an embodiment, the Function (F1) may implement Asymmetric Key Encryption using elliptic curve cryptography (ECC). Specifically, Function (F1) may use the Secret-Key (S1) as the private key input and combine it with the Unique-Number (N1) through point multiplication on the selected elliptic curve. The Secret-Key (S1) acts as the scalar multiplier while the Unique-Number (N1) is used to derive the base point on the curve. This multiplication results in a point on the curve that becomes the Public-Key (P1). The one-way nature of ECC ensures that even with knowledge of P1 and N1, it remains computationally infeasible to derive S1, thereby maintaining the security of the biometric-derived secret key while enabling reliable authentication through the derived public key.

As the final steps in the registration process, the processor 201 performs two crucial storage operations. First, it stores the Unique-Number (N1) in two locations: on the user's device and in a secure data repository. This dual storage approach ensures both accessibility and backup of this important identifier. Secondly, the processor 201 stores the Public-Key (P1) as the base identifier of the user in a people registry. This registry serves as a secure database that associates each user's Public-Key (P1) with their account, allowing for secure identification without compromising sensitive information.

Through these comprehensive steps, the processor 201 establishes a robust and secure identity for each user within the system 101, laying the foundation for secure interactions and personalized experiences.

In one embodiment, the processor 201 may be configured for executing programmed instructions corresponding to the Ontology Module 204 for defining one or more ontologies based on inputs received from developer users. The Ontology Module 204 is designed to perform a series of interconnected functions that collectively contribute to the creation of comprehensive and structured ontologies for the Interactive Transactions.

The process begins with the Ontology Module 204 receiving inputs from developer users. These inputs are crucial as they specify the concepts, categories, properties, and relationships for each domain relevant to the System 101. This initial step allows the system 101 to capture the expertise and domain knowledge of the developers, ensuring that the resulting ontologies are tailored to the specific needs of the system 101.

Upon receiving these inputs, the Ontology Module 204 proceeds to create a hierarchical structure of objects. This structure represents the concepts and categories specified by the developer users. The hierarchical nature of this structure is particularly important as it allows for the representation of broader and narrower concepts within each domain. This capability enables the system 101 to capture the nuanced relationships between different levels of abstraction within a given domain.

The next function of the Ontology Module 204 involves organizing the concepts, categories, properties, and relationships into one or more sets of hierarchically structured objects. This organization step is critical as it allows for a comprehensive representation of the domain knowledge. It not only captures the individual elements but also illustrates how different elements relate to each other within the hierarchy. This relational aspect of the organization provides a rich context for understanding the interconnections within the domain knowledge.

The final function of the Ontology Module 204 is to build the one or more ontologies based on the sets of hierarchically structured objects that have been created and organized in the previous steps. These ontologies serve as a formalized representation of the domain knowledge, encapsulating the concepts, relationships, and hierarchies defined by the developers. Importantly, these ontologies are not created in isolation but are specifically designed for use by the Schema Module 205 in subsequent steps of the process. This forward-looking aspect ensures that the ontologies created by the Ontology Module 204 seamlessly integrate into the broader workflow of the system 101.

Through these interconnected functions, the Ontology Module 204 plays a crucial role in establishing the foundational knowledge structures that underpin the system 101. By transforming developer inputs into structured, hierarchical ontologies, it sets the stage for the creation of sophisticated, context-aware Interactive Transactions.

In one embodiment, the processor 201 may be configured for executing programmed instructions corresponding to the Schema Module 205 for building one or more schemas based on the one or more ontologies. The Schema Module 205 is designed to perform a series of interconnected functions that collectively contribute to the creation and management of schemas for the System 101.

The process begins with the Schema Module 205 receiving one or more ontologies from the Ontology Module 204. These ontologies are crucial as they serve as the foundation for creating structured schemas that align with the defined concepts, categories, properties, and relationships of each domain. By basing the schemas on these ontologies, the Schema Module 205 ensures that the resulting data structures accurately reflect the complex relationships and hierarchies established in the ontological definitions.

Upon receiving the ontologies, the Schema Module 205 proceeds to generate a set of schemas based on this input. This generation process is complex and involves translating the ontological structures into schema formats that can be used for data storage and querying. The Schema Module 205 must carefully map the concepts and relationships defined in the ontologies to appropriate schema elements, ensuring that the resulting schemas can effectively capture and organize data in a way that reflects the underlying domain knowledge.

Once the schemas are generated, the Schema Module 205 maintains them in a schema library within its system. This schema library serves as a comprehensive repository of all generated schemas, allowing for efficient management and retrieval of schema definitions. By centralizing the storage of schemas, the Schema Module 205 facilitates version control, updates, and consistency across the System 101.

The final function of the Schema Module 205 involves selecting a subset of schemas from the schema library for use by the Graph Database Module 206. This selection process is not arbitrary but is based on inputs received from one or more Publisher-Users. By incorporating user input into the schema selection process, the Schema Module 205 ensures that the resulting graph databases are tailored to the specific needs of the Interactive Transactions being developed. This user-driven approach allows for flexibility and customization in the data structures underlying each Interactive Transaction, optimizing the system's ability to capture and process relevant information.

Through these interconnected functions, the Schema Module 205 plays a crucial role in bridging the gap between abstract ontological definitions and concrete data structures. By generating, maintaining, and selectively deploying schemas based on ontologies and user input, it enables the System 101 to create sophisticated, context-aware forms that accurately reflect complex domain knowledge while meeting specific user requirements.

In one embodiment, the processor 201 may be configured for executing programmed instructions corresponding to the Graph Database Module 206 for developing one or more graph databases using the one or more schemas. The Graph Database Module 206 is designed to perform a series of interconnected functions that collectively contribute to the creation of sophisticated graph databases for the system 101.

The process begins with the Graph Database Module 206 receiving a subset of schemas from the Schema Module 205. This subset is carefully selected based on inputs from Publisher-Users. The significance of this user-driven selection cannot be overstated, as it ensures that the resulting graph databases are tailored to the specific needs of the Interactive Transactions being developed. These schemas serve as the structural blueprint for the graph databases, providing a framework that reflects both the underlying domain knowledge and the particular requirements of the forms.

Upon receiving these schemas, the Graph Database Module 206 proceeds to perform a critical analysis and identification process. The Graph Database Module 206 meticulously identifies nodes and edges based on the received subset of schemas. In the context of graph databases, nodes represent entities or concepts defined in the schemas. These could be tangible objects, abstract ideas, or any other discrete elements relevant to the domain. Edges, on the other hand, represent the relationships between these entities or concepts. By identifying these nodes and edges, the Graph Database Module 206 begins to map out the complex web of interconnections that will form the backbone of the graph database.

The final and perhaps most crucial function of the Graph Database Module 206 is the actual creation of one or more graph databases based on the identified nodes and edges. This creation process is complex and multifaceted. It involves setting up the fundamental structure of the database, which is designed to efficiently store and query graph-based data. The Graph Database Module 206 defines the properties of nodes and edges, ensuring that each entity and relationship in the database carries the appropriate attributes and metadata. Furthermore, the Graph Database Module 206 establishes the connections between nodes according to the specifications laid out in the schemas. This step is vital in creating a database that not only stores information but also accurately represents the relationships and interactions between different pieces of data.

Through these interconnected functions, the Graph Database Module 206 transforms abstract schema definitions into concrete, queryable graph databases. These databases are not merely storage systems but sophisticated knowledge representations that capture the complex relationships and interactions within the domain. By leveraging the power of graph structures, the Graph Database Module 206 enables the system 101 to perform complex queries, uncover hidden relationships, and provide rich, context-aware functionality to users. The graph databases created by the Graph Database Module 206 serve as the foundational data layer upon which the dynamic and intelligent features of the Interactive Transaction system are built.

In one embodiment, the processor 201 may be configured for executing programmed instructions corresponding to the Knowledge Graph Module 207 for generating one or more knowledge graphs using the one or more graph databases and the one or more ontologies. The Knowledge Graph Module 207 is designed to perform a series of sophisticated functions that collectively contribute to the creation and refinement of knowledge graphs within the System 101.

The Knowledge Graph Module 207 begins its operations by integrating with the Large Language Model 208, a crucial step that significantly enhances its processing capabilities. This integration allows the Knowledge Graph Module 207 to leverage advanced natural language processing and machine learning techniques in the generation and manipulation of knowledge graphs.

Once integrated, the Knowledge Graph Module 207 facilitates the reception of training data into the Large Language Model 208. This training data serves as the foundation for the knowledge that will be encoded in the resulting graphs. The Large Language Model 208 then utilizes the Large Language Model 208 to translate this training data into a set of semantic (RDF) triples. This translation process is critical as it transforms unstructured or semi-structured information into a standardized, machine-readable format that forms the building blocks of the knowledge graph.

Following the creation of semantic triples, the Knowledge Graph Module 207 again employs the Large Language Model 208, this time to generate RDF queries. These queries are designed to explore and interrogate the semantic triples, enabling the system 101 to extract meaningful insights and relationships from the encoded knowledge.

To ensure the integrity and consistency of the knowledge representation, the Knowledge Graph Module 207 then engages the Semantic Reasoner Module 209. The Semantic Reasoner Module 209 is tasked with validating the internal logic of the set of semantic (RDF) triples, checking for contradictions, redundancies, or logical inconsistencies within the knowledge structure.

The Knowledge Graph Module 207 then initiates a sophisticated querying process. The Knowledge Graph Module 207 begins by executing a first query to traverse across one or more triple stores, which are specialized databases designed to store and retrieve RDF triples efficiently. Upon obtaining the results of this first query, the module applies these results to formulate a second, more refined query. This second query is then executed, again traversing across one or more triple stores.

This querying process is not a one-time operation but part of a larger, iterative mechanism. The Knowledge Graph Module 207 creates a feedback loop of cascading queries and results that spans all accessible Knowledge Graphs. This continuous cycle of querying, result analysis, and query refinement allows the system to generate a completely normalized and consistent set of Knowledge Graphs. Through this process, the Knowledge Graph Module 207 can uncover hidden relationships, resolve inconsistencies, and create a rich, interconnected representation of domain knowledge.

In one embodiment, the processor 201 may be configured for executing programmed instructions corresponding to the Large Language Model 208 for enhancing the processing capabilities of the Knowledge Graph Module 207. The Large Language Model 208 is a critical component that brings advanced natural language processing and machine learning capabilities to the knowledge graph generation process.

The primary function of the Large Language Model 208 is to receive and process training data related to the domain of interest. This training data can come in various forms, including text documents, structured data, or even conversational inputs. The model's sophisticated algorithms allow it to understand and analyze this material in a way that mimics human comprehension, extracting key concepts, relationships, and contextual information.

Once the training data is processed, the Large Language Model 208 performs the crucial task of translating this material into a set of semantic (RDF) triples. This translation process is where the true power of the model shines, as it effectively transforms unstructured data into structured knowledge. The resulting RDF triples capture not just the raw information from the training data, but also the implicit relationships and semantic meanings, creating a rich knowledge representation that can be easily integrated into the broader knowledge graph.

In addition to translation, the Large Language Model 208 is also responsible for generating RDF queries. These queries are specifically designed to interrogate and explore the semantic triples created from the training data. By leveraging its understanding of natural language and the domain-specific knowledge it has acquired, the model can generate queries that are both syntactically correct and semantically meaningful. These queries enable the Knowledge Graph Module 207 to navigate the complex web of information encoded in the knowledge graph, uncovering insights and relationships that might not be immediately apparent.

Through these functions, the Large Language Model 208 serves as a powerful engine for knowledge extraction, transformation, and exploration within System 101. Its capabilities not only enhance the process of knowledge graph generation but also contribute to the overall intelligence and adaptability of the system 101.

In one embodiment, the processor 201 may be configured for executing programmed instructions corresponding to the Semantic Reasoner Module 209 for validating the internal logic of the set of semantic (RDF) triples. The Semantic Reasoner Module 209 plays a crucial role in ensuring the integrity and consistency of the knowledge represented within the system 101.

The primary function of the Semantic Reasoner Module 209 is to apply logical rules and inference mechanisms to the set of RDF triples. This process involves a thorough examination of the knowledge base, checking for contradictions, redundancies, or gaps in the knowledge represented by the RDF triples. By applying these logical rules, the module can identify inconsistencies that might not be immediately apparent, ensuring that the knowledge base maintains a high level of accuracy and reliability.

In addition to validation, the Semantic Reasoner Module 209 is capable of inferring logical conclusions from the semantic triples generated from submissions and responses. This inference capability allows the system to derive new knowledge based on existing information, enhancing the overall intelligence of the System 101. By drawing these logical conclusions, the module can uncover hidden relationships and insights that may not have been explicitly stated in the original data.

Furthermore, the Semantic Reasoner Module 209 is responsible for validating the consistency and coherence of the entire knowledge base created by the Knowledge Graph Module 207. This overarching validation ensures that as new information is added to the knowledge graph, it remains consistent with the existing knowledge. This function is critical in maintaining the integrity of the knowledge base as it grows and evolves over time.

In one embodiment, the processor 201 may be configured for executing programmed instructions corresponding to the Preference Store Module 210 for building and maintaining user preferences. The Preference Store Module 210 is a sophisticated component designed to enhance the personalization capabilities of the System 101.

The Preference Store Module 210 begins its operations by receiving preferences from target Submitter-Users. These preferences can encompass a wide range of user-specific information, from simple interface preferences to complex domain-specific choices. Once received, the module interacts with the Triple store Module 220 to identify the triples corresponding to the target Submitter-User's preferences. This step is crucial in translating user preferences into the semantic structure used throughout the system.

After identifying the relevant triples, the Preference Store Module 210 combines them to generate a personal-preference knowledge graph corresponding to the target Submitter-User. This knowledge graph serves as a comprehensive representation of the user's preferences within the context of the system's broader knowledge structure. The Preference Store Module 210 then leverages this personal-preference knowledge graph to offer personalized services to the target Submitter-User, enhancing their experience with the System 101.

The Preference Store Module 210 also plays a role in Interactive Transaction composition, creating sets of Interactive Transactions comprised of one or more fields. Each of these fields corresponds to a domain-specific schema element selected from the schema library, ensuring that the forms are both personalized and aligned with the underlying knowledge structure of the system.

On a broader scale, the Preference Store Module 210 combines personal-preference knowledge graphs from multiple Submitter-Users to generate domain-specific aggregated preference knowledge graphs. This aggregation allows the system 101 to identify trends and patterns across users within specific domains. Taking this a step further, the Preference Store Module 210 combines these domain-specific aggregated preference knowledge graphs to generate insights across multiple domains, providing a comprehensive view of user preferences and behaviors.

Leveraging these cross-domain insights, the Preference Store Module 210 is capable of predicting market trends. These predictions are based on the aggregated preferences and behaviors of users across various domains, providing valuable foresight for decision-making processes. Finally, the Preference Store Module 210 uses these predicted market trends to offer one or more services, allowing the System 101 to proactively meet user needs and adapt to changing preferences.

Through these interconnected functions, the Preference Store Module 210 not only enhances the personalization of individual user experiences but also contributes to the overall adaptability and predictive capabilities of the System 101.

In one embodiment, the processor 201 may be configured for executing programmed instructions for authenticating users. The authentication process begins with receiving a biometric sample captured from the user in real-time. This immediate capture of biometric data ensures that the authentication is based on the user's current physical characteristics, adding a crucial layer of security to the process. Once received, the module processes this biometric sample to generate a Secret-Key (S2). This Secret-Key is a unique identifier derived directly from the user's biometric data, serving as a foundational element in the authentication process.

Following the generation of the Secret-Key (S2), the processor 201 may be configured to fetch the Public-Key (P1) corresponding to the user from the user device. This retrieval is based on the base identifier associated with the user's account. The Public-Key (P1) serves as a publicly available identifier that is intricately linked to the user's private information without exposing that sensitive data.

With both the Secret-Key (S2) and the Public-Key (P1) at hand, the processor 201 then computes a Real-Time-Unique-Number (N2). This computation involves using the Public-Key (P1), the newly generated Secret-Key (S2), and a predefined Function (F1). The Function (F1) is a critical component of the authentication process, designed to combine these elements in a way that produces a unique, time-sensitive identifier.

The finally the processor 201 may be configured for comparing the computed Real-Time-Unique-Number (N2) with the Unique-Number (N1) that is stored on the user's device. This comparison is the crux of the authentication process. If the Real-Time-Unique-Number (N2) matches the stored Unique-Number (N1), it confirms that the current biometric input corresponds to the registered user, thus authenticating the user's identity. This method ensures a high level of security, as it requires both the user's current biometric data and access to their registered device for successful authentication.

Through this multi-step process, the processor 201 provides a robust and secure method of verifying user identities. By combining biometric data, device-specific information, and complex cryptographic functions, the system 101 enables a platform that is both highly secure and difficult to compromise, ensuring the integrity of user access.

In one embodiment, the processor 201 may be configured for executing programmed instructions corresponding to the Transaction Composer Module 211 for composing a set of Interactive Transactions. The Transaction Composer Module 211 is designed to perform a series of interconnected functions that collectively contribute to the creation of sophisticated, context-aware forms within the system 101.

The primary function of the Transaction Composer Module 211 is to compose Interactive Transactions based on Transaction fields received from one or more Publisher-Users. This process involves integrating various input types and structures to create forms that are both functional and aligned with the specific needs of the publishers. As part of this composition process, the Transaction Composer Module 211 ensures that each of the selectable input Transaction fields, and optionally any free text input Transaction fields, is mapped to one or more semantic triples. These semantic triples are based on the ontologies and schemas defined within the system, creating a rich, machine-readable context for each Transaction Field. This mapping is crucial as it allows the forms to integrate seamlessly with the broader knowledge structure of the system 101.

The Transaction Composer Module 211 is designed to provide a comprehensive environment for engineering Interactive Transactions. This module is responsible for composing Interactive Transactions based on Transaction fields received from one or more Publisher-Users, integrating various input types and structures to create forms that are both functional and aligned with specific needs. As part of this composition process, the Transaction Composer Module 211 ensures that each selectable input Transaction field and any free text input Transaction field is mapped to one or more semantic triples based on the ontologies and schemas defined within the system, creating a rich, machine-readable context for each Transaction Field.

The Transaction Composer Module 211 provides several key functionalities: First, it offers input fields where each field is meticulously mapped to a JSON parameter, creating a structured data representation accessible externally via API endpoints. This enables Integration with other systems and facilitates seamless data exchange. Second, it incorporates a sophisticated rules engine for creating complex rules in respect of the fields in Interactive Transactions. These rules can define validation criteria, dependencies between fields, conditional visibility, and other dynamic behaviors, significantly enhancing form intelligence and responsiveness. Third, it provides configurable actions that can be associated with Transaction fields. These actions might include calculations, data lookups, triggering notifications, or initiating workflows.

The configurability allows Interactive Transaction creators to tailor form behavior to specific business processes without requiring extensive coding. The module also provides an interface for building comprehensive workflows composed of input fields, rules governing these fields, and associated actions. This workflow-building capability enables the creation of sophisticated, multi-step forms that can guide users through complex processes while ensuring data integrity and automating follow-up actions.

The Transaction Library Module 212 serves as a central repository and management system for all Interactive Transactions within the system 101. At its core, it provides a robust hosting platform for the entire set of Interactive Transactions, ensuring secure storage and ready accessibility. The module assigns a unique Universal Transaction ID to each Interactive Transaction, creating a distinct identification system.

For Transaction state management, the Transaction Library Module 212 interfaces with the Ontology Module 204 to access a superset of Transaction States. From this superset, which includes states such as draft, pending, or approved, it selects a subset applicable to the Target Interactive Transaction, enabling flexible and context-appropriate state management.

User permission management is another critical function of the Transaction Library Module 212. It creates and maintains a list of users with specific permissions, categorized into three main types, namely permission to access and compose Interactive Transaction instances using the Transaction Composer Module 211, permission to access and submit Interactive Transactions, and permission to access and process received submissions.

This granular permission system ensures users can only perform authorized actions. Additionally, the module provides an interface for authorized users to receive submissions, with each user represented by an identity token, enhancing security and user management. Through these comprehensive functions, the Transaction Library Module 212 ensures that Interactive Transactions are not only securely stored and managed but also accessible to the right users at the right time. Its integration of hosting, state management, user permissions, and authentication processes makes it a crucial component in the overall architecture of the System 101, facilitating the smooth operation of form-related activities while maintaining high standards of security and organization.

The Permission Module 213 manages user permissions for Interactive Transactions. The processor 201 executes programmed instructions corresponding to the Permission Module 213 to set and enforce access controls based on inputs from Publisher-Users, managing access for viewing, editing, submitting, and processing the Interactive Transactions.

The Transaction Publishing Platform 214 makes Interactive Transactions and related content accessible to authorized users. When executing its programmed instructions, the Transaction Publishing Platform 214 publishes the set of Interactive Transactions, refined inputs from Submitter-Users, refined responses from Publisher-Users, and outcomes determined from submission-response cycles.

The Refining Module 215 processes inputs and responses through a sophisticated pipeline. The processor 201 executes a series of refinement steps of:

1. Uses the Artificial Intelligence Module 216 to validate inputs based on a training dataset
2. Employs the Large Language Model (LLM) Module 217 to translate validated inputs into corresponding semantic triples
3. Utilizes the Semantic Reasoner Module 209 to infer logical inferences from semantic triples
4. Uses the Synthesis Module 218 to synthesize these logical inferences into a refined Interactive Transaction Submission.

The Refining Module 215 applies this same process to responses received from Publisher-Users, ensuring consistent quality enhancement across all interactions.

The Artificial Intelligence Module 216 validates both inputs and responses. Using training datasets, it validates inputs from Submitter-Users and responses from Publisher-Users to ensure data quality and consistency. The Large Language Model (LLM) Module 217 handles semantic translation, converting validated inputs and responses into semantic triples that capture their meaning in a machine-readable format.

The Synthesis Module 218 produces refined submissions by synthesizing logical inferences derived from semantic analysis. This produces both refined Interactive Transaction Submissions and refined Interactive Transaction Submission Responses.

The Transaction Composer Module 211 provides comprehensive features for Interactive Transaction engineering. It offers input fields mapped to JSON parameters accessible via API endpoints and includes a sophisticated rules engine for creating field-specific rules. The module provides configurable actions for Transaction fields and interfaces for building workflows incorporating fields, rules, and actions.

Furthermore, the Transaction Composer Module 211 offers interfaces for various user interactions. It allows Publisher-Users to configure parametric evaluation of input values and Interactive Transaction processor users to provide evaluation responses. The Transaction Composer Module 211 enables Publisher-Users to configure contextual links and endorsement settings, allowing Submitter-Users to insert links and request endorsements via @mentions. The Transaction Composer Module 211 also provides an interface for configuring referral settings. In other words, the Transaction Composer Module 211 includes specialized interfaces for different user roles:

- For Publisher-Users: Interfaces for configuring parametric evaluation of input values, managing endorsement settings, and recording evaluation responses
- For Submitter-Users: Interfaces for submitting parametric evaluations and inserting contextual links
- For both roles: Interfaces for capturing SelfKey based signatures and handling authentication.

For Submitter-Users, the Transaction Composer Module 211 offers features like automatic field population using data from their Personal Data Vault, fee calculation, and the ability to attach SelfKey based signatures to forms. Publisher-Users can also use this signature feature.

The Triple store Module 220 is responsible for managing semantic triples. When the processor 201 executes its programmed instructions, this module interacts with the Knowledge Graph Module 207 to receive knowledge graphs. It then creates RDF triples in a subject-predicate-object structure based on these graphs and stores them in a triplestore. The Triple store Module 220 also connects to curated data sources, regularly updating the triplestore data. The resulting triplestore is built for use by both the Preference Store Module 210 and the Semantic Reasoner Module 209.

Figure 3:
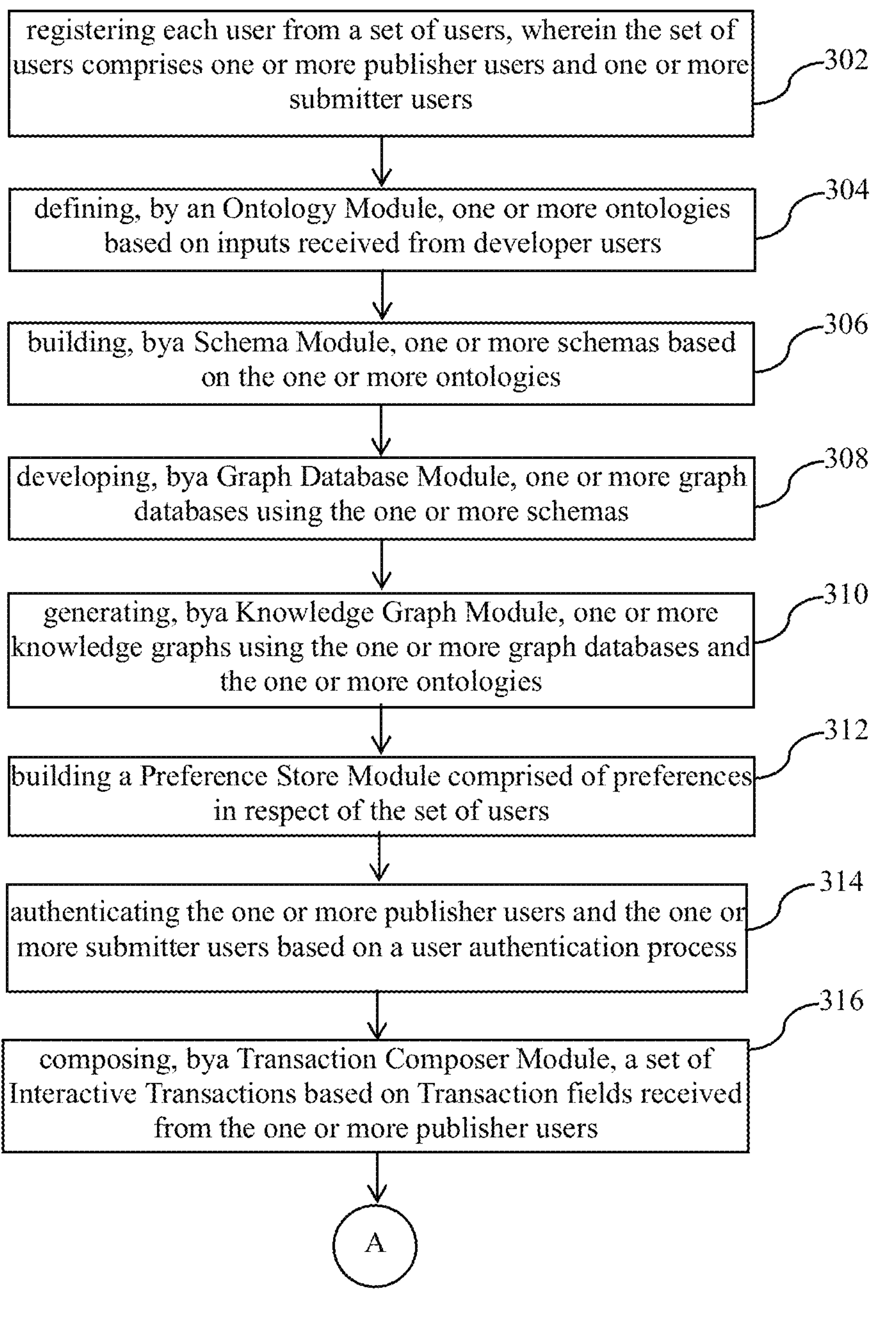
FIG. 3 illustrates a method 300 for providing Interactive Transaction Frameworks, in accordance with an embodiment of the present disclosure.
Figure 3:
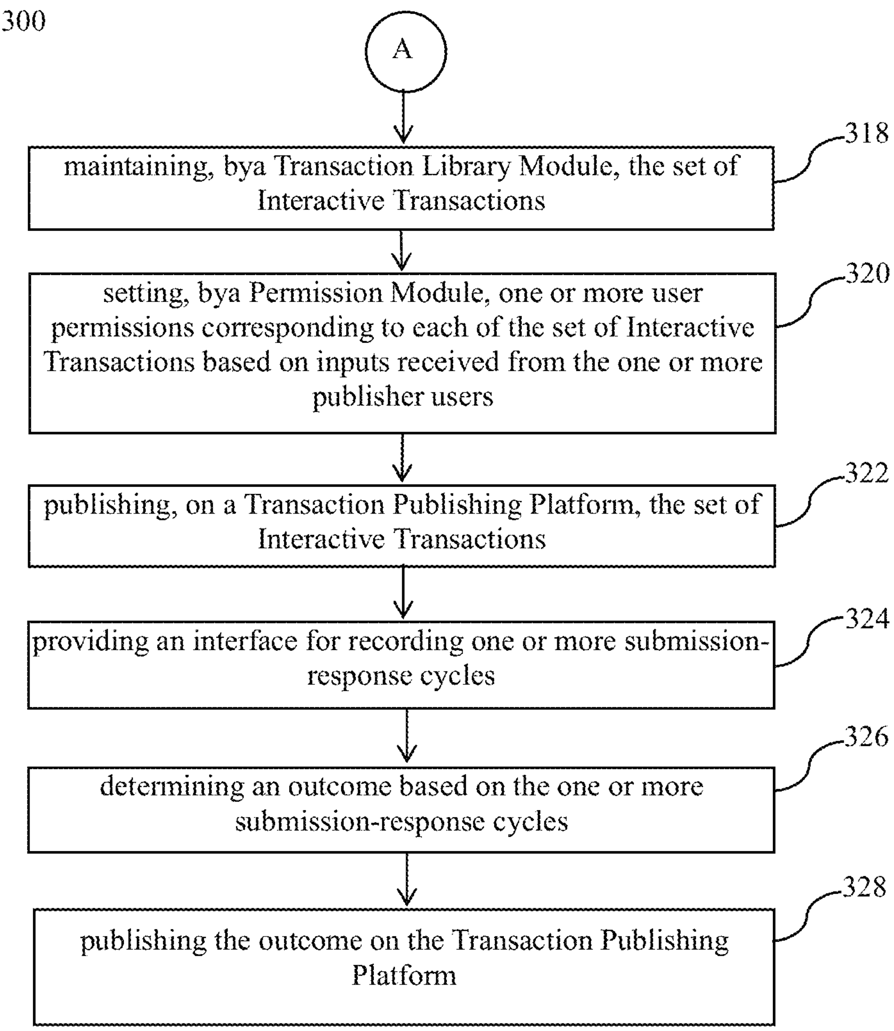

Referring to FIG. 3, a method 300 for providing Interactive Transactions using tokenized identity and biometric authentication is illustrated, in accordance with an embodiment of the present subject matter.

At Step 302, the method involves registering each user from a set of users comprising one or more Publisher-Users and one or more Submitter-Users. The registration process captures biometric samples and processes them through a specific cryptographic workflow that generates a Secret-Key (S1), creates a Unique-Number (N1) using a random number generation algorithm, and applies Function (F1) based on Asymmetric Key Encryption to compute a Public-Key (P1). This process ensures the Public-Key is distinct from the Secret-Key while maintaining their cryptographic relationship. The system stores the Unique-Number both on the user's device and in a data repository, while storing the Public-Key as the base identifier in a people registry. The process for user registration is further elaborated with reference to FIG. 4.

At Step 304, the method proceeds to define one or more ontologies using the Ontology Module 204. These ontologies are based on inputs received from developer users and serve as the foundational structure for the system's knowledge representation. The process of defining the one or more ontologies using the Ontology Module 204 comprises several sub-steps. First, the Ontology Module 204 receives inputs from the developer users. These inputs specify concepts, categories, properties, and relationships for each domain relevant to the System 101. For example, in a healthcare domain, concepts might include "Patient", "Doctor", and "Treatment"; categories could be "Inpatient" and "Outpatient"; properties might include "Name", "Age", and "Diagnosis"; and relationships could be "treated by" or "diagnosed with". Next, the Ontology Module 204 creates a hierarchical structure of objects representing the concepts and categories specified by the developer users. This hierarchical structure allows for the representation of broader and narrower concepts. For instance, "Healthcare Professional" might be a broader concept that includes "Doctor", "Nurse", and "Therapist" as narrower concepts.

The Ontology Module 204 then organizes the concepts, categories, properties, and relationships into one or more sets of hierarchically structured objects. This organization allows for a comprehensive representation of the domain knowledge, including how different elements relate to each other within the hierarchy.

Finally, the Ontology Module 204 builds the one or more ontologies based on the one or more sets of hierarchically structured objects. These ontologies are created for use by the Schema Module 205 in subsequent steps of the process. The ontologies provide a formal representation of domain knowledge that can be used for various purposes within the System 101, including Transaction Field mapping, data validation, and knowledge inference.

By following this process, the Ontology Module 204 ensures that the created ontologies accurately represent the complex relationships and structures within each domain, providing a robust foundation for the System 101's knowledge representation and reasoning capabilities.

At Step 306, the method builds one or more schemas using the Schema Module 205. These schemas emerge from the ontologies defined in the previous step and provide a structured framework for data organization. The Schema Module 205 first receives the ontologies from the Ontology Module 204, using them as foundation for creating structured schemas that align with the defined concepts, categories, properties, and relationships of each domain. The module generates these schemas and maintains them in a schema library, from which it selects a subset for use by the Graph Database Module 206 based on inputs received from the Publisher-Users. This process enables the creation of sophisticated, context-aware forms that reflect complex domain knowledge while meeting specific user requirements.

This process enables the Schema Module 205 to create a flexible and extensible schema framework that can adapt to various Interactive Transaction requirements while maintaining consistency with the underlying ontological structures. The selected subset of schemas provides the Graph Database Module 206 with the necessary structure to create graph databases that efficiently store and retrieve data for the System 101.

At Step 308, the method develops one or more graph databases using the Graph Database Module 206. These graph databases are constructed using the schemas built in the previous step, allowing for efficient storage and retrieval of complex, interconnected data. The process of developing the one or more graph databases using the Graph Database Module 206 comprises several sub-steps. First, the Graph Database Module 206 receives the subset of schemas from the Schema Module 205. This subset of schemas, previously selected based on inputs from Publisher-Users, provides the structural blueprint for the graph databases to be developed. Next, the Graph Database Module 206 identifies nodes and edges based on the received subset of schemas. In this context, nodes represent entities or concepts defined in the schemas, while edges represent the relationships between these entities or concepts. For example, in a healthcare-related schema, "Patient" and "Doctor" might be identified as nodes, while "treated by" could be identified as an edge connecting these nodes. The Graph Database Module 206 carefully analyzes each schema to ensure all relevant entities and relationships are properly identified and mapped to the graph structure. Finally, the Graph Database Module 206 creates one or more graph databases based on the identified nodes and edges. This creation process involves setting up the database structure, defining the properties of nodes and edges, and establishing the connections between them according to the schema specifications. The Graph Database Module 206 ensures that the resulting graph databases accurately reflect the complex relationships and hierarchies defined in the schemas, while also optimizing for efficient querying and data retrieval.

These graph databases are specifically created for use by the Knowledge Graph Module 207 in subsequent steps of the process. By structuring the data in this interconnected manner, the Graph Database Module 206 enables the Knowledge Graph Module 207 to perform complex queries, traverse relationships, and extract meaningful insights from the data.

This approach allows the system 101 to handle complex, interconnected data structures efficiently, providing a robust foundation for the knowledge representation and reasoning capabilities of the system. The graph databases developed in this step play a crucial role in enabling the sophisticated functionality of the Interactive Transactions, including context-aware Interactive Transaction generation and intelligent data analysis.

At Step 310, the method generates one or more knowledge graphs using a Knowledge Graph Module 207. These knowledge graphs are created using the graph databases and ontologies developed in previous steps. The Knowledge Graph Module 207 is integrated with the Large Language Model 208 for enhanced processing capabilities. The process of generating the knowledge graphs involves several sub-steps and interactions with other modules.

First, the Knowledge Graph Module 207 uses the ontologies from the Ontology Module 204 and schemas from the Schema Module 205 to build semantic (RDF) triples in a subject-predicate-object structure. This structure allows for the representation of complex relationships and facts within the knowledge graph. For example, a triple might be structured as "Patient001 (subject)—has diagnosis (predicate)—Diabetes (object)".

Next, the Knowledge Graph Module 207 stores these semantic (RDF) triples in a triplestore. The triplestore serves as a specialized database for the efficient storage and retrieval of RDF triples.

The Knowledge Graph Module 207 is also responsible for updating the triple stores based on changes in one or more ontologies or schemas. This ensures that the knowledge graph remains consistent with the latest definitions and structures in the system.

The process of constructing the semantic triples involves additional steps performed by the Triple store Module 220. The Triple store Module 220 receives the knowledge graph from the Knowledge Graph Module 207. Based on this knowledge graph, the Triple store Module 220 creates RDF triples in a subject-predicate-object structure. These triples capture the relationships and facts represented in the knowledge graph in a standardized format.

The Triple store Module 220 then stores the created triples in a triplestore. This triplestore is designed for efficient storage and querying of RDF data. To enhance the knowledge base, the Triple store Module 220 connects to curated data sources and regularly updates the data in the triplestore. This ensures that the knowledge graph incorporates the most up-to-date and relevant information from trusted sources.

Finally, the Triple store Module 220 builds the triplestore for use by the Preference Store Module 210 and the Semantic Reasoner Module 209. This allows these modules to leverage the comprehensive and structured knowledge represented in the RDF triples for various system functions, such as user preference management and semantic reasoning.

Throughout this process, the Knowledge Graph Module 207 leverages the capabilities of the integrated Large Language Model 208. The Large Language Model 208 enhances the processing capabilities of the Knowledge Graph Module 207, potentially assisting in tasks such as natural language understanding, relationship extraction, and knowledge inference. The steps for generating the knowledge graphs are further elaborate with reference to FIG. 5.

Step 312 involves building the Preference Store Module 210, a crucial component of the system responsible for managing and utilizing user preferences to provide personalized services and generate market insights. The Preference Store Module 210 begins by receiving preferences from target Submitter-Users, capturing these through various interactions with the system, including Interactive Transaction submissions and explicit preference settings. The module then interacts with the Triple store Module 220 to identify RDF triples corresponding to the target Submitter-User's preferences, representing semantic relationships between users, their preferences, and related concepts within the system's knowledge structure.

Using these identified triples, the Preference Store Module 210 generates a personal-preference knowledge graph for each target Submitter-User, providing a comprehensive view of the user's preferences and their relationships to various domains and concepts. This personal-preference knowledge graph is then utilized to offer personalized services to the user, such as tailored recommendations, customized Transaction fields, or personalized content delivery. The Preference Store Module 210 is also involved in composing Interactive Transactions with fields corresponding to domain-specific schema elements selected from the schema library maintained by the Schema Module 205.

The Preference Store Module 210 functionality extends beyond individual user preferences. It combines personal-preference knowledge graphs from multiple Submitter-Users to create domain-specific aggregated preference knowledge graphs, representing collective preferences within specific domains. These aggregated graphs are then combined across multiple domains to generate cross-domain insights, providing a holistic view of user preferences and trends. Based on these insights, the Preference Store Module 210 predicts market trends and uses these predictions to offer services aligned with emerging market trends and user preferences.

Throughout these processes, the Preference Store Module 210 maintains preferences in the form of RDF triples, based on the ontologies defined by the Ontology Module 204 and the schemas built by the Schema Module 205. This semantic representation allows for flexible and powerful preference management and utilization within the system, enabling the module to effectively capture, analyze, and leverage user preferences across various domains and use cases.

At Step 314, the method authenticates the Publisher-Users and Submitter-Users through a defined process that begins with capturing real-time biometric samples. The system processes these samples to generate a Secret-Key (S2), then fetches the stored Public-Key (P1) from the user's device based on their base identifier. Using the Public-Key (P1), Secret-Key (S2), and Function (F1), the system computes a Real-Time-Unique-Number (N2). Authentication succeeds when this computed number matches the Unique-Number (N1) stored on the user's device. The steps for authentication are further elaborated with reference to FIG. 6.

Step 316 of the method involves composing a set of Interactive Transactions using the Transaction Composer Module 211. The Transaction Composer Module 211 is designed to engineer Interactive Transactions for Publisher-Users, Submitter-Users, and form-processor users, creating a versatile and interactive form-building environment. The Transaction Composer Module 211 works in close conjunction with the Transaction Composer Module 211 to achieve this functionality.

The process begins with the Transaction Composer Module 211 providing input fields for the Interactive Transactions. Each of these input fields is meticulously mapped to a JSON parameter, creating a structured data representation of the Interactive Transaction elements. This mapping is crucial as the JSON parameters can be accessed externally via an API endpoint, allowing for integration with other systems and facilitating data exchange. This feature enables the Interactive Transactions to be part of a larger ecosystem, enhancing their utility and flexibility.

Beyond basic input field creation, the Transaction Composer Module 211 incorporates a sophisticated rule engine. This rules engine allows for the creation of complex rules in respect of one or more fields in the set of Interactive Transactions. These rules can define validation criteria, dependencies between fields, conditional visibility, and other dynamic behaviors, significantly enhancing the intelligence and responsiveness of the forms.

In addition to the rule engine, the Transaction Composer Module 211 provides a set of configurable actions that can be associated with the fields in the Interactive Transactions. These actions might include calculations, data lookups, triggering notifications, or initiating workflows. The configurability of these actions allows Interactive Transaction creators to tailor the behavior of the forms to specific business processes or user needs without requiring extensive coding.

To bring all these elements together, the Transaction Composer Module 211 provides an interface for building comprehensive workflows. These workflows are composed of the input fields, the rules governing these fields, and the actions associated with them. This workflow-building capability allows for the creation of sophisticated, multi-step forms that can guide users through complex processes, ensure data integrity, and automate follow-up actions.

In an embodiment, the Transaction Composer Module 211 provides an interface for Publisher-Users to configure parametric evaluation of input values submitted by Submitter-Users. This same interface allows Interactive Transaction processor users to provide parametric evaluation responses, enabling a dynamic and Interactive Transaction processing workflow. The Transaction Composer Module 211 also offers an interface for Publisher-Users to configure contextual links, such as references to open-source articles. Submitter-Users can utilize this feature to insert relevant contextual links directly into the Target Interactive Transaction, enriching the submitted information with additional context and resources.

The Transaction Composer Module 211 provisions an interface for Publisher-Users to configure endorsement settings. These settings allow Submitter-Users to @mention individuals and request endorsements. The @mentioned individuals can then add their endorsements, which are attached to the Submitter-User's submission of the Target Interactive Transaction. This feature facilitates a social proof mechanism within the Interactive Transaction submission process, potentially increasing the credibility and value of submitted information.

An interface for configuring referral settings is provided to Publisher-Users. Based on these settings, Submitter-Users with the requisite permissions can provide referrals to other users. This functionality could be particularly useful in scenarios where recommendations or introductions are a valuable part of the Interactive Transaction submission process.

To streamline the form-filling process, the Transaction Composer Module 211 provides an interface for Submitter-Users to automatically populate input fields in the Target Interactive Transaction using data stored in their Personal Data Vault 223. This feature not only saves time for users but also ensures consistency and accuracy of frequently used personal information across multiple Interactive Transaction submissions.

The Transaction Composer Module 211 provides an interface for Submitter-Users to calculate fees, which could be particularly useful in scenarios where Interactive Transaction submission is associated with certain costs or charges. This feature ensures transparency and allows users to understand any financial implications before completing their submission.

Security and authentication are enhanced through an interface that allows both Publisher-Users and Submitter-Users to capture their SelfKey based signature and attach it to the Target Interactive Transaction. The system authenticates users using their SelfKey, and upon successful authentication, provides access to Interactive Transaction builder, Transaction submitter, or Interactive Transaction processor roles and their associated features. This biometric authentication method adds an additional layer of security and non-repudiation to the Interactive Transaction submission and processing workflow.

Throughout these processes, the Transaction Composer Module 211 ensures that each Transaction Field is mapped to semantic triples based on the ontologies defined by the Ontology Module 204 and the schemas constructed by the Schema Module 205. This semantic underpinning allows for rich, machine-readable meaning to be associated with Interactive Transaction data, facilitating advanced analysis and knowledge extraction.

By integrating these diverse functionalities, the Transaction Composer Module 211 and associated system interfaces create a powerful ecosystem for Interactive Transactions. This ecosystem goes beyond simple data collection, offering features for contextual enrichment, social proof, automated data entry, fee calculation, and robust security. The result is a flexible, intelligent Interactive Transaction management system capable of adapting to a wide range of complex business processes and user needs.

Throughout this process, the Transaction Composer Module 211 orchestrates the overall composition of the Interactive Transactions. The Transaction Composer Module 211 integrates the input fields, rules, actions, and workflows created through the Transaction Composer Module 211 into cohesive, functional forms. Moreover, the Transaction Composer Module 211 ensures that each Transaction Field is mapped to semantic triples based on the ontologies defined by the Ontology Module 204 and the schemas constructed by the Schema Module 205. This semantic mapping imbues the Interactive Transactions with rich, machine-readable meaning, facilitating advanced data analysis, integration, and knowledge extraction.

By leveraging these capabilities, the Transaction Composer Module 211 enables the creation of Interactive Transactions that are not merely data collection tools, but intelligent, responsive interfaces capable of adapting to user inputs, enforcing business rules, and initiating complex workflows. The seamless integration of the Transaction Composer Module 211 with the Transaction Composer Module 211, along with the semantic underpinnings provided by the ontologies and schemas, results in a powerful system for creating sophisticated, knowledge-rich forms tailored to the needs of various user types and business processes.

Step 318 of the method involves maintaining the set of Interactive Transactions using the Transaction Library Module 212. This module is responsible for rendering a sophisticated storage environment that incorporates various features and functionalities crucial for effective Interactive Transaction management.

The Transaction Library Module 212 begins by providing a robust hosting platform for the entire set of Interactive Transactions, ensuring that all forms are securely stored and readily accessible when needed. As part of this process, the module assigns a Unique Universal Transaction ID to each Interactive Transaction within the set, creating a distinct identification system that allows every Interactive Transaction to be recognized and accessed within the system.

In terms of Transaction state management, the Transaction Library Module 212 interfaces with the Ontology Module 204 to access a superset of Transaction states. From this superset, which includes states such as draft, pending, or approved, the Transaction Library Module 212 selects a subset of states applicable to the Target Interactive Transaction. This feature allows for flexible and context-appropriate state management of forms.

User permission management is another critical function of the Transaction Library Module 212. The Transaction Library Module 212 creates and maintains a list of users with specific permissions, categorized into three main types: permission to access the Target Interactive Transaction and build instances using the Transaction Composer Module 211, permission to access the Target Interactive Transaction and make submissions, and permission to access the Target Interactive Transaction and process received submissions. This granular permission system ensures that users can only perform actions they are authorized to do. Additionally, the Transaction Library Module 212 provides an interface for the list of authorized users to receive submissions, with each user represented by a set of identity tokens, enhancing security and user management.

When a target user requests access to the Target Interactive Transaction, the Transaction Library Module 212 initiates a series of processes. The module receives the access request, then authenticates the target user via the user authentication process. This process is based on the user's anonymous SelfKey, which serves as one or more biometric factors. After authentication, the Transaction Library Module 212 tokenizes the user's identity, further enhancing security and privacy.

Following the authentication and tokenization processes, the Transaction Library Module 212 determines whether the target user has the necessary permissions to create an instance of the Target Interactive Transaction. If the permissions are successfully verified, the Transaction Library Module 212 provides the Publisher-Users with access to the Transaction Composer Module 211.

Through these comprehensive functionalities, the Transaction Library Module 212 ensures secure, organized, and efficient management of Interactive Transactions. The module facilitates controlled access, maintains Transaction states, and integrates with other system components like the Transaction Composer Module 211 and the Ontology Module 204 to provide a cohesive Interactive Transaction management experience. This intricate system of Interactive Transaction maintenance and access control plays a crucial role in the overall architecture, ensuring that Interactive Transactions are managed effectively and securely throughout their lifecycle.

The system 101 extends its capabilities beyond basic Interactive Transaction composition and submission, offering a suite of advanced functionalities that enhance user interaction, workflow management, and data analysis. These features are implemented through various interfaces and mechanisms, each designed to address specific aspects of complex Interactive Transaction processing and management.

The system 101 provides an interface to facilitate workflows requiring multiple signatures. This functionality supports both sequential and parallel signature processes, allowing for complex approval workflows where multiple parties need to sign off on a form, either in a specific order or simultaneously. This feature is particularly useful for scenarios involving multi-step approvals or collaborative decision-making processes.

An appointment setting interface is integrated into the system, enabling users to schedule meetings or events directly through the Interactive Transaction. This feature can be valuable in contexts where Interactive Transaction submission leads to follow-up appointments, such as in healthcare or customer service scenarios.

To ensure data integrity, the system incorporates a mechanism for validating values entered by users. This validation can occur in real-time as users input data, providing immediate feedback and reducing errors in Interactive Transaction submissions. The validation mechanism can be configured to check for data types, ranges, formats, and other criteria specific to each Transaction Field.

User convenience is enhanced through an interface that allows users to save drafts of the Target Interactive Transaction and access them later. This feature is particularly useful for complex forms that may require information gathering or consultation before final submission, allowing users to complete forms over multiple sessions.

The system 101 includes a notification feature that alerts users based on predefined configurations. These notifications can be triggered by various events such as Interactive Transaction submissions, approvals, or deadlines, keeping all relevant parties informed throughout the Interactive Transaction lifecycle.

Collaboration and communication are facilitated through an interface for configuring, adding, and managing comments on the Target Interactive Transaction. This feature allows users to discuss specific aspects of the form, ask questions, or provide additional context directly within the Interactive Transaction environment.

To enhance user expression and engagement, the system provides an interface for configuring, adding, and managing emoticons on the Target Interactive Transaction. This feature allows users to convey sentiment or reaction quickly and intuitively, adding a layer of non-verbal communication to the Interactive Transaction interaction.

The system includes an interface for configuring, adding, and managing the action of sharing the Target Interactive Transaction. This functionality enables users to distribute forms to relevant parties, potentially expanding the reach and impact of the form-based processes.

Feedback management is supported through an interface that allows users to configure, add, and manage feedback on the Target Interactive Transaction. This feature can be used to gather user opinions, suggestions for improvement, or other types of feedback related to the Interactive Transaction or its associated processes.

For data-driven decision making, the system provides an interface for performing and viewing comparative and time-series based data analytics in respect of the values handled in the Target Interactive Transaction. This powerful feature allows users to analyze trends, compare data across different time periods or categories, and derive insights from the collected Interactive Transaction data.

These advanced functionalities, when combined with the core Interactive Transaction composition and management features of the Transaction Composer Module 211 and related components, create a comprehensive ecosystem for Interactive Transactions. The system goes beyond simple data collection, offering tools for complex workflows, user engagement, collaboration, and data analysis. By providing these diverse interfaces and mechanisms, the system can adapt to a wide range of business processes and user needs, from simple surveys to complex, multi-stage approval workflows with analytics capabilities.

Step 320 of the method involves setting user permissions for each of the Interactive Transactions using the Permission Module 213. This step is crucial for implementing a granular access control system within the Interactive Transaction ecosystem, ensuring that users have appropriate levels of access to forms and their associated functionalities.

The Permission Module 213 operates based on inputs received from Publisher-Users, who are typically responsible for creating and managing the Interactive Transactions. These Publisher-Users have the authority to define who can access, view, edit, or submit each form, as well as who can process or analyze the submitted data.

The permission-setting process begins with the Permission Module 213 presenting an interface to the Publisher-Users. This interface allows them to specify various levels of permissions for different user roles or individual users. The types of permissions that can be set may include:

- View permissions: Determining who can see the existence of an Interactive Transaction and its contents
- Edit permissions: Specifying who can modify the structure or content of a form
- Submit permissions: Defining who can fill out and submit the form.
- Process permissions: Indicating who can access and process the submitted Interactive Transaction data.
- Analyze permissions: Determining who can perform analytics on the Interactive Transaction data.

The Permission Module 213 allows for these permissions to be set at various levels of granularity. For instance, permissions can be assigned to:

- Individual users based on their unique identifiers
- User roles or groups (e.g., "managers", "employees", "external partners")
- Organizational units or departments
- Based on specific attributes of users (e.g., job title, location, security clearance)

Furthermore, the Permission Module 213 may incorporate conditional logic in permission settings. For example, a Publisher-User might set a rule that allows access to an Interactive Transaction only during certain time periods, or only after certain conditions are met (such as the completion of a prerequisite or approval from a specific authority).

Once the Publisher-User defines these permissions, the Permission Module 213 translates these settings into a machine-readable format, possibly utilizing the semantic triple structure that is prevalent in other parts of the system. These permission settings are then stored in association with each Interactive Transaction, creating a permission profile for the form.

The Permission Module 213 works in conjunction with the authentication system established in Step 314. When a user attempts to access an Interactive Transaction, the system first authenticates the user's identity using the biometric-based process. Once the user's identity is confirmed, the Permission Module 213 checks the user's credentials against the permission profile of the requested form. Based on this check, the system then grants or denies access to various functionalities of the form.

The Permission Module 213 also maintains an audit trail of permission changes. This feature allows for tracking who made changes to permissions, when these changes were made, and what specific alterations occurred. This audit trail is crucial for maintaining accountability and for troubleshooting any permission-related issues that may arise.

In addition to form-specific permissions, the Permission Module 213 may also manage system-level permissions. These could include permissions to create new forms, manage user accounts, view system-wide analytics, or access administrative functions of the Interactive Transaction Framework system.

The Permission Module 213 is designed to be flexible and scalable, allowing for easy updates to permission settings as organizational needs change or as the Interactive Transaction Framework system evolves. It may also include features for bulk permission management, allowing Publisher-Users to set or modify permissions for multiple forms or users simultaneously.

By implementing this sophisticated permission-setting process, the Interactive Transaction Framework system ensures that sensitive data and critical functionalities are protected, while still allowing for efficient collaboration and data sharing where appropriate. This granular control over user access is essential for maintaining the security, privacy, and integrity of the information handled within the Interactive Transaction Framework ecosystem.

Step 322 of the method involves publishing the set of Interactive Transactions on the Transaction Publishing Platform 214. This step is crucial in making the created forms accessible to the intended users and integrating them into the broader ecosystem of the Interactive Transaction Framework system.

The Transaction Publishing Platform 214 serves as a centralized hub for hosting and distributing Interactive Transactions. When an Interactive Transaction is ready to be published, the Publisher-User initiates the publishing process through an interface provided by the Transaction Composer Module 211. This interface allows the Publisher to review the Interactive Transaction one last time, set publication parameters, and trigger the actual publishing action.

Upon initiation of the publishing process, the Transaction Publishing Platform 214 performs several key actions:

Version Control: The platform assigns a version number to the Interactive Transaction being published. This versioning system allows for tracking changes over time and potentially reverting to previous versions if needed. It also enables the platform to manage multiple versions of the same Interactive Transaction simultaneously, which can be crucial for maintaining continuity in ongoing processes while introducing updates.

Metadata Generation: The Transaction Publishing Platform 214 generates and attaches metadata to the published form. This metadata might include information such as the Interactive Transaction creator, creation date, last modification date, Interactive Transaction category, and any tags or keywords associated with the form. This metadata facilitates easier searching and categorization of forms within the platform.

Access Control Integration: The platform integrates the permission settings established by the Permission Module 213 in Step 320. This ensures that the published Interactive Transaction is only accessible to users with the appropriate permissions, maintaining the security and privacy controls set by the Publisher.

Indexing: The Transaction Publishing Platform 214 indexes the content of the published form, including its fields, descriptions, and associated metadata. This indexing process enables efficient searching and retrieval of forms within the platform.

Distribution Channel Configuration: The platform allows the Publisher to specify the distribution channels for the form. This could include making the Interactive Transaction available on a web portal, sending it via email to specific users, or integrating it with other systems or applications.

Notification System: Upon successful publication, the Transaction Publishing Platform 214 may trigger notifications to relevant users or systems. For instance, it might notify designated Submitter-Users that a new Interactive Transaction is available for their input, or alert form-processor users about a new Interactive Transaction they need to monitor.

Analytics Initialization: The platform sets up initial analytics tracking for the published form. This might include creating baseline metrics for Interactive Transaction views, submission rates, completion times, and other relevant performance indicators.

API Endpoint Generation: For forms that need to be accessed programmatically, the Transaction Publishing Platform 214 generates and exposes API endpoints. These endpoints allow other systems or applications to interact with the published form, retrieving its structure, submitting data, or querying its status.

Archiving: The platform archives the previous version of the Interactive Transaction (if any) while making the new version active. This archiving process ensures that historical data and Interactive Transaction structures are preserved for reference or audit purposes.

Availability Testing: Before finalizing the publication, the platform performs availability and accessibility tests to ensure that the Interactive Transaction is properly rendered and functional across different devices and browsers.

Compliance Check: Depending on the system's configuration, the Transaction Publishing Platform 214 might perform a final compliance check to ensure that the published Interactive Transaction meets all necessary regulatory or organizational standards.

Once these processes are complete, the Interactive Transaction becomes live on the Transaction Publishing Platform 214, ready for access by authorized users. The platform continues to monitor the form's performance, usage statistics, and any issues that may arise post-publication.

This comprehensive publishing process ensures that Interactive Transactions are not only made available to users but are also properly versioned, secured, indexed, and integrated into the broader ecosystem of the Interactive Transaction system. By leveraging the Transaction Publishing Platform 214, the system provides a robust and scalable solution for managing and distributing forms across an organization or to external stakeholders.

Step 324 of the method involves providing an interface for recording submission-response cycles, which is a crucial component in the Interactive Transaction system. This step encompasses a series of sophisticated processes that leverage various modules to refine and enhance both Interactive Transaction submissions and responses.

The submission-response cycle begins with the system receiving inputs from Submitter-Users through the interface. These inputs are then passed to the Refining Module 215, which employs a multi-stage process to validate, enrich, and refine the submitted data. The refined submissions are subsequently published on the Transaction Publishing Platform 214, making them available for further processing or review.

The Refining Module 215 plays a central role in this process, applying a series of advanced techniques to both submissions and responses. For Interactive Transaction submissions, the Refining Module 215 first utilizes the Artificial Intelligence Module 216 to validate the inputs. This validation process is based on a training dataset, allowing the system to identify potential errors, inconsistencies, or anomalies in the submitted data. This AI-driven validation adds an extra layer of data quality assurance beyond traditional rule-based validations.

Once validated, the inputs are passed to the Large Language Model (LLM) Module 217. The LLM Module 217 translates the validated inputs into semantic triples, which are structured representations of the data in a subject-predicate-object format. This translation process transforms the raw Interactive Transaction data into a format that is rich in meaning and can be easily processed by semantic technologies.

The semantic triples generated by the LLM Module 217 are then processed by the Semantic Reasoner Module 209. The Semantic Reasoner Module 209 applies logical inference rules to the semantic triples, deriving additional information and relationships that may not be explicitly stated in the original submission. This step enhances the depth and breadth of information extracted from the Interactive Transaction submission.

Finally, the Synthesis Module 218 takes the logical inferences produced by the Semantic Reasoner Module 209 and synthesizes them into a refined Interactive Transaction Submission. This synthesis process consolidates the original inputs, the validated data, the semantic representations, and the inferred information into a comprehensive and enriched submission.

The Refining Module 215 applies a similar process to the responses provided by Publisher-Users or form-processor users. When a response is received, the Artificial Intelligence Module 216 first validates the response based on a training dataset. This ensures that the responses meet certain quality standards and are consistent with expected patterns or guidelines.

The validated responses are then passed to the Large Language Model (LLM) Module 217, which translates them into semantic triples. This translation process allows the system to represent the response data in a structured, machine-readable format that captures the semantic meaning of the response.

The Semantic Reasoner Module 209 then processes these semantic triples, applying logical inference rules to derive additional insights or implications from the response data. This step can uncover hidden relationships or conclusions within the response that may not be immediately apparent.

Lastly, the Synthesis Module 218 takes the logical inferences produced from the response data and synthesizes them into a refined Interactive Transaction Submission Response. This refined response incorporates the original response, its semantic representation, and any additional insights or information inferred during the reasoning process.

By applying these sophisticated refining processes to both submissions and responses, the system ensures that the data flowing through the Interactive Transaction ecosystem is not only validated for accuracy but also enriched with additional semantic meaning and logical inferences. This refined data, published on the Transaction Publishing Platform 214, provides a rich foundation for further analysis, decision-making, or subsequent processing steps in the Interactive Transaction lifecycle.

The entire submission-response cycle, from initial input to refined response, showcases the system's ability to leverage advanced AI and semantic technologies to enhance the quality and depth of information processed through Interactive Transactions. This approach transforms simple Interactive Transaction submissions into knowledge-rich artifacts that can drive more informed decision-making and more effective business processes. The steps corresponding to each submission-response cycles are further elaborated with reference to FIG. 7.

Step 326 of the method is a crucial part of the submission-response cycle in the Interactive Transaction system. This step involves receiving responses from Publisher-Users corresponding to the inputs previously submitted by Submitter-Users. These responses are then refined using the Refining Module 215 and published on the Transaction Publishing Platform 214, completing the feedback loop of the Interactive Transaction process.

The process begins when a Publisher-User, who has the necessary permissions to review and respond to Interactive Transaction submissions, accesses the submitted Interactive Transaction data. This access is typically facilitated through an interface provided by the Transaction Publishing Platform 214, which presents the Publisher with a view of the submitted data along with tools for formulating a response.

When the Publisher-User crafts their response, they may be interacting with a structured response interface that mirrors the original form's structure, or they might be providing more freeform feedback, depending on the nature of the Interactive Transaction and the specific requirements of the process. The response might include approvals, rejections, requests for additional information, or detailed feedback on the submitted data.

Once the Publisher-User submits their response, it enters the refinement process handled by the Refining Module 215. This refinement process for responses mirrors the process applied to the original Interactive Transaction submissions, as detailed in claim 3 of the patent. The refinement process consists of several sophisticated steps:

- Validation: The Artificial Intelligence Module 216 within the Refining Module 215 validates the response based on a training dataset. This validation ensures that the response meets predefined quality standards, is consistent with expected patterns, and doesn't contain any obvious errors or inconsistencies.
- Semantic Translation: The Large Language Model (LLM) Module 217 then translates the validated response into one or more corresponding semantic triples. This translation process transforms the natural language or structured response into a format that is rich in meaning and can be easily processed by semantic technologies.
- Logical Inference: The Semantic Reasoner Module 209 processes the semantic triples generated from the response, applying logical inference rules to derive additional information and relationships that may not be explicitly stated in the original response. This step enhances the depth and breadth of information extracted from the response.
- Synthesis: Finally, the Synthesis Module 218 takes the logical inferences produced by the Semantic Reasoner Module 209 and synthesizes them to produce a refined Interactive Transaction Submission Response. This synthesis process consolidates the original response, its semantic representation, and any inferred information into a comprehensive and enriched response.

After the refinement process, the response is ready for publication on the Transaction Publishing Platform 214. The publication process for responses may involve several steps:

- Association with Original Submission: The platform links the refined response to the original Interactive Transaction submission, maintaining a clear relationship between submission and response.
- Versioning: If multiple responses are allowed, the platform may implement versioning to track the history of responses over time.
- Notification: The system may notify the original Submitter-User that a response to their submission is available.
- Access Control: The platform applies appropriate access controls to ensure that the response is only visible to authorized users.
- Analytics Update: The publication of the response may trigger updates to analytics tracking, providing insights into response times, types of responses, and other relevant metrics.
- Workflow Progression: In cases where the Interactive Transaction is part of a larger workflow, the publication of the response may trigger the next steps in that workflow.
- The publication of the refined response on the Transaction Publishing Platform 214 makes it available for viewing by authorized users, including the original Submitter. This completes one cycle of the submission-response process, potentially leading to further interactions or actions based on the content of the response.

By applying the same level of sophisticated processing to responses as it does to original submissions, the Interactive Transaction system ensures that all data flowing through the system is enriched with semantic meaning, validated for quality, and integrated into the broader knowledge ecosystem. This approach transforms simple Interactive Transaction interactions into rich, knowledge-driven processes that can support complex decision-making and workflow management.

At Step 328, the method determines an outcome based on the submission-response cycles and publishes this outcome on the Transaction Publishing Platform 214. The outcome determination and publishing process begins with a thorough analysis of the one or more submission-response cycles recorded for a Target Interactive Transaction. Each cycle encompasses inputs from Submitter-Users, which are then refined by the Refining Module, followed by responses from Publisher-Users, which are also refined. The system processes this collected data to determine an outcome, which may involve analyzing the refined inputs and responses, applying predefined rules or criteria set by Publisher-Users, utilizing the Knowledge Graph Module to draw insights from the data, employing the Large Language Model to interpret complex interactions, and using the Semantic Reasoner Module to make logical inferences.

Once an initial outcome is determined, it may be further refined through the Refining Module 215. This refinement process could include validating the outcome using the Artificial Intelligence Module 216, translating it into semantic triples using the Large Language Model (LLM) Module 217, inferring logical conclusions using the Semantic Reasoner Module 209, and synthesizing the refined outcome using the Synthesis Module 218. The final, refined outcome is then published on the Transaction Publishing Platform 214. This publication process may involve formatting the outcome for display, applying appropriate access permissions using the Permission Module 213, integrating the outcome with relevant knowledge graphs, and updating the Transaction Library Module 212 with the outcome information.

After publication, the system may notify relevant users, such as Publishers, Submitters, or other authorized parties, about the published outcome. Users with appropriate permissions can then access and view the outcome on the Transaction Publishing Platform 214. The published outcome is not isolated but becomes an integral part of the system's knowledge base. This integration may involve updating relevant ontologies in the Ontology Module 204, refining schemas in the Schema Module 205, enriching the graph databases in the Graph Database Module 206, and expanding the knowledge graphs in the Knowledge Graph Module 207.

Importantly, the published outcome may trigger a new cycle of Interactive Transaction submissions and responses, creating a continuous feedback loop for Interactive Transaction evolution and knowledge enrichment. This iterative process showcases how the system leverages its various modules to process, refine, and publish outcomes based on the complex interactions captured in the Interactive Transactions, ultimately contributing to a growing, interconnected knowledge base.

Figure 4:
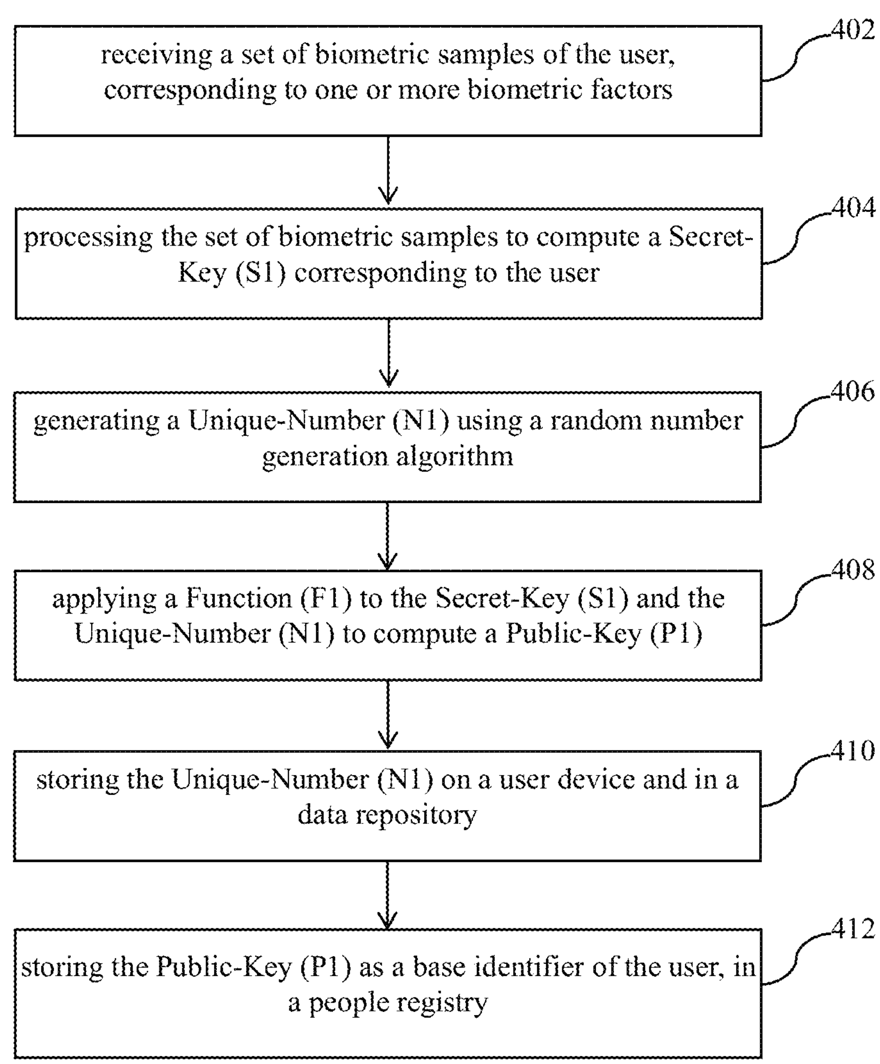
FIG. 4 illustrates a method 400 for user registration, in accordance with an embodiment of the present disclosure.

FIG. 4 illustrates a method 400 for registering each user from a set of users. The set of users comprises one or more Publisher-Users and one or more Submitter-Users. Method 400 corresponds to a detailed breakdown of the user registration process as specified in the claims, providing a step-by-step implementation of the biometric-based identity creation system.

At Step 402, the method begins by receiving a set of biometric samples from the user. These samples correspond to one or more biometric factors, which could include facial features, iris patterns, fingerprints, or voice recordings. The system 101 may use specialized hardware such as fingerprint scanners or cameras to capture these biometric samples with high accuracy. This step is crucial as it forms the foundation of the user's unique identity within the system 101.

At Step 404, the method proceeds to process the set of biometric samples to compute a Secret-Key (S1) corresponding to the user. This processing likely involves complex algorithms that extract unique features from the biometric samples and convert them into a cryptographic key. The Secret-Key (S1) is a critical component of the user's identity, as it's derived directly from their biometric data and cannot be easily replicated or guessed.

At Step 406, the method generates a Unique-Number (N1) using a random number generation algorithm. This step adds an additional layer of security to the user's identity. The random number generation algorithm likely uses a cryptographically secure method to ensure the Unique-Number is truly random and cannot be predicted. This Unique-Number serves as an additional factor in the user's identity, complementing the biometric-derived Secret-Key.

At Step 408, the method applies Function (F1) to the Secret-Key (S1) and the Unique-Number (N1) to compute a Public-Key (P1). This function implements Asymmetric Key Encryption using elliptic curve cryptography (ECC). The Secret-Key (S1) acts as the private key input and combines with the Unique-Number (N1) through point multiplication on the selected elliptic curve, where S1 serves as the scalar multiplier and N1 helps derive the base point. The resulting point on the curve becomes the Public-Key (P1). This cryptographic approach ensures that even with knowledge of P1 and N1, deriving S1 remains computationally infeasible, maintaining the security of the biometric-derived secret key while enabling reliable authentication through the derived public key.

At Step 410, the method stores the Unique-Number (N1) in two locations: on the user's device and in a data repository. Storing on the user's device allows for quick local authentication, while storing in a data repository provides a backup and allows for authentication across different devices. This dual storage approach balances convenience with security, ensuring the user can always access their account while also providing a fallback in case of device loss or failure.

At Step 412, the method concludes by storing the Public-Key (P1) as the base identifier of the user in a people registry. This registry is likely a secure database that associates each user's Public-Key with their account. By using the Public-Key as the base identifier, the system can securely identify users without storing or transmitting sensitive biometric data or secret keys. This approach enhances privacy and security, as the Public-Key can be freely shared without compromising the user's private information.

Figure 5:
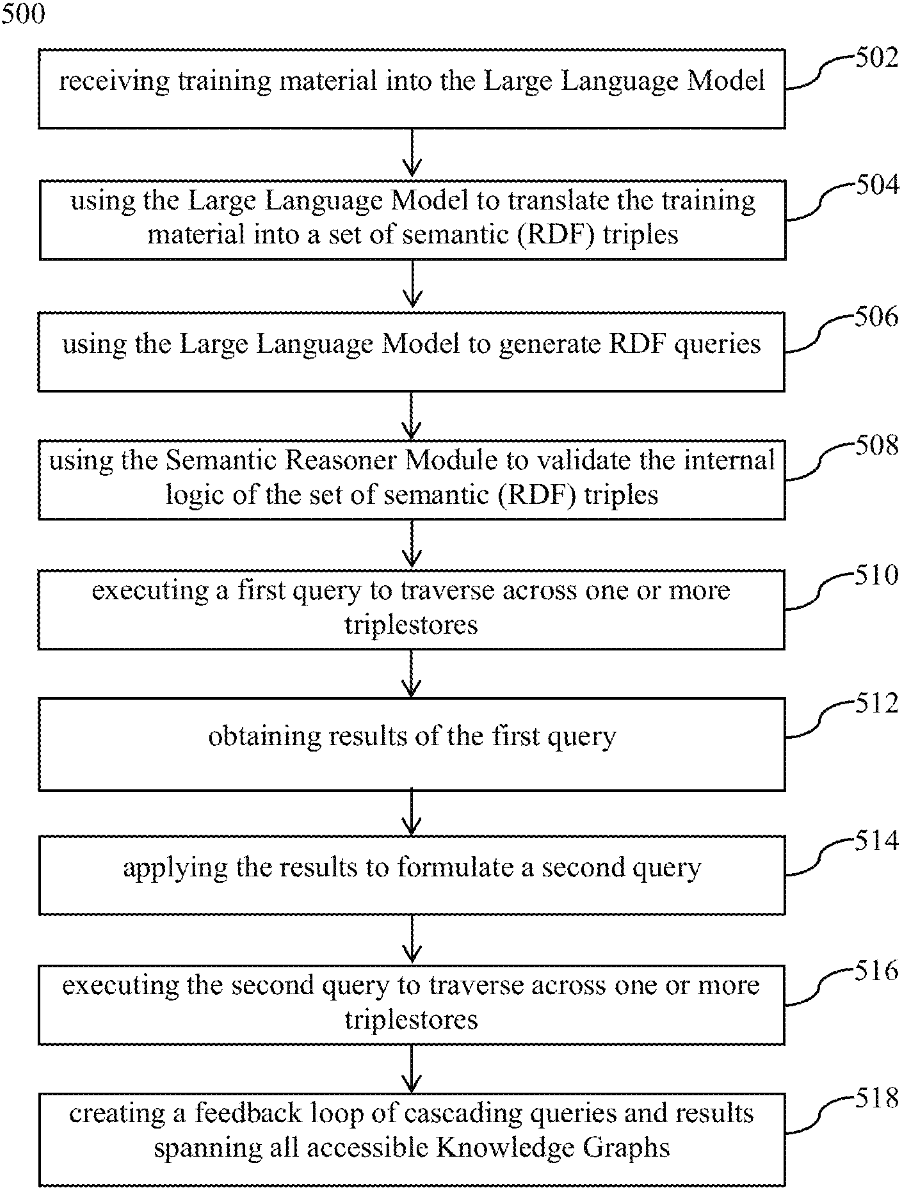
FIG. 5 illustrates a method 500 for generating knowledge graphs, in accordance with an embodiment of the present disclosure.

FIG. 5 illustrates a method 500 for knowledge graph generation, in accordance with an embodiment of the present disclosure. Method 500 corresponds to step 310 of method 300 and provides a detailed breakdown of the process used by the Knowledge Graph Module when integrated with the Large Language Model to generate completely normalized and consistent knowledge graphs through iterative refinement and validation.

At Step 502, the method begins by receiving training data into the Large Language Model (LLM). This training data likely consists of a diverse set of texts, documents, and data relevant to the domain of interest. The LLM, being a sophisticated AI model, is capable of processing and understanding this material in a way that mimics human comprehension.

At Steps 504 and 506 At Steps 504 and 506, the method leverages the Large Language Model in two crucial ways. First, it translates the training data into a set of semantic (RDF) triples, transforming unstructured information into a standardized, machine-readable format that forms the foundation of the knowledge graph. Then, based on this semantic structure, the Large Language Model generates RDF queries specifically designed to traverse and examine these semantic triples, enabling the system to discover relationships and patterns within the knowledge base.

This dual application of the Large Language Model ensures both proper knowledge representation and effective knowledge exploration.

At Step 508, the method employs the Semantic Reasoner Module to validate the internal logic of the set of semantic (RDF) triples. This step is crucial for ensuring the consistency and coherence of the knowledge base. The Semantic Reasoner applies logical rules and inference mechanisms to check for contradictions, redundancies, or gaps in the knowledge represented by the RDF triples.

At Step 510, the method executes a first query to traverse across one or more triple stores. A triplestore is a specialized database for storing and retrieving RDF triples. This query, generated by the LLM, explores the knowledge base, potentially spanning multiple triple stores to gather relevant information.

At Step 512, the method obtains results from the first query. These results represent a subset of the knowledge base that matches the criteria specified in the query. They may include direct matches as well as inferred knowledge derived from the semantic relationships in the RDF triples.

At Step 514, the method applies the results obtained from the first query to formulate a second query. This step demonstrates the system's ability to learn and adapt. By analyzing the results of the first query, the system can identify areas that require further exploration or clarification, leading to the formulation of a more refined and targeted second query.

At Step 516, the method executes the second query to traverse across one or more triple stores. This query, built upon the insights gained from the first query, delves deeper into the knowledge base, potentially uncovering more nuanced or complex relationships within the data.

At Step 518, the method implements a sophisticated feedback loop of cascading queries and results that spans all accessible Knowledge Graphs. This iterative process uses the results of each query to formulate increasingly refined subsequent queries, enabling the system to explore and connect information across the entire knowledge base. The feedback loop continues until it achieves a completely normalized and consistent set of Knowledge Graphs, ensuring comprehensive coverage and logical coherence across the entire knowledge domain.

The outcome of this process is the generation of a completely normalized and consistent set of Knowledge Graphs. These Knowledge Graphs represent a highly refined and interconnected body of knowledge, where inconsistencies have been resolved, redundancies eliminated, and implicit connections made explicit. This robust knowledge base serves as the foundation for the System 101, enabling sophisticated reasoning and decision-making capabilities.

This comprehensive process leverages the power of Large Language Models, semantic web technologies, and iterative refinement to transform raw training data into a rich, consistent, and highly interconnected knowledge base. The resulting Knowledge Graphs provide a solid foundation for advanced applications within the System 101, enabling complex queries, inferencing, and knowledge discovery.

Figure 6:
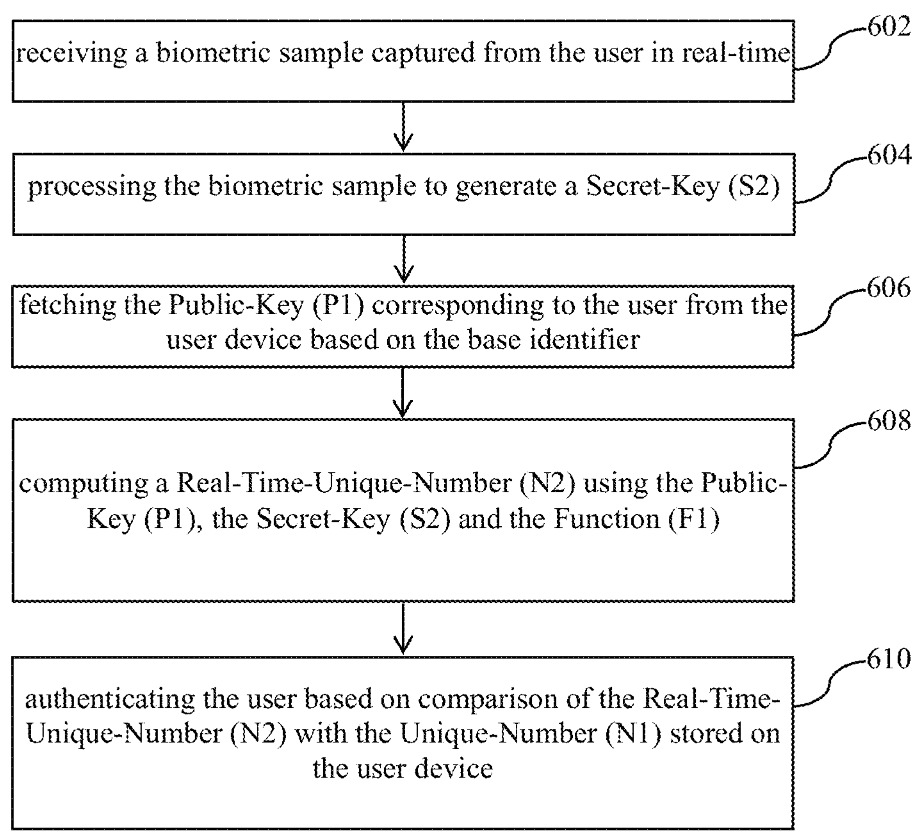
FIG. 6 illustrates a method 600 for user authentication, in accordance with an embodiment of the present disclosure.

FIG. 6 illustrates a method 600 for user authentication process, in accordance with an embodiment of the present disclosure. Method 600 corresponds to step 314 of method 300 and demonstrates how the system authenticates both Publisher-Users and Submitter-Users using the biometric-based authentication framework established during registration.

At Step 602, the method begins by receiving a biometric sample captured from the user in real-time. This step initiates the authentication process, where the system collects fresh biometric data from the user who is attempting to access the system. The biometric sample could be a fingerprint scan, facial recognition data, iris scan, or any other form of biometric input supported by the system. This real-time capture ensures that the authentication is based on the user's current physical presence, adding a layer of security against replay attacks or the use of stored biometric data.

At Step 604, the method proceeds to process the biometric sample to generate a Secret-Key (S2). This processing involves complex algorithms that extract unique features from the biometric sample and convert them into a cryptographic key. The Secret-Key (S2) is a temporary key generated for this specific authentication attempt and is distinct from the Secret-Key (S1) generated during the initial registration process. This approach ensures that even if this temporary key is compromised, it doesn't affect the security of the user's overall account.

At Step 606, the method fetches the Public-Key (P1) corresponding to the user from the user device based on the base identifier. The Public-Key (P1), which was stored during the registration process, serves as the user's unique identifier within the system. By retrieving this key from the user's device, the system ensures that the authentication attempt is linked to the correct user account. This step also verifies that the authentication attempt is being made from a recognized device associated with the user.

At Step 608, the method computes a Real-Time-Unique-Number (N2) using three components: the Public-Key (P1), the Secret-Key (S2), and the Function (F1). This computation mirrors the registration process's cryptographic approach, applying the same Function (F1) based on Asymmetric Key Encryption. The process combines the stored identifier (P1) with the freshly generated biometric key (S2) through the same cryptographic function used during registration. If the biometric input is valid, this computation should yield a number that corresponds to the user's original Unique-Number, enabling secure authentication without exposing the underlying biometric data.

At Step 610, the method completes the authentication process by comparing the Real-Time-Unique-Number (N2) with the Unique-Number (N1) stored on the user device. This comparison serves as the definitive verification step-a match confirms that the current biometric input corresponds to the registered user, while a mismatch results in authentication failure. This approach provides a robust security mechanism that combines biometric verification with cryptographic security while maintaining user privacy, as the actual biometric data never needs to be stored or transmitted directly.

Figure 7:
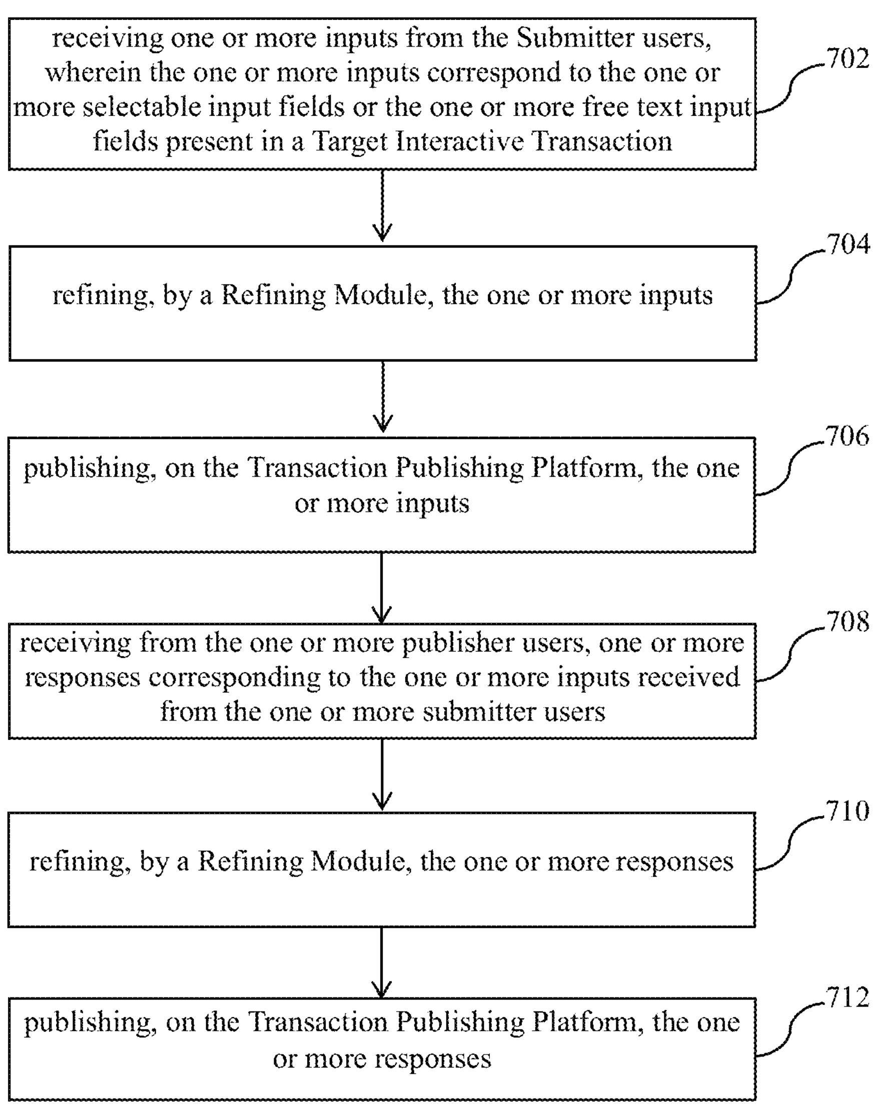
FIG. 7 illustrates a method 700 for managing submission-response cycles, in accordance with an embodiment of the present disclosure.

FIG. 7 illustrates a method 700 for Interactive Transaction Submission and response processing, in accordance with an embodiment of the present disclosure. Method 700 corresponds to step 324 of method 300 and details the complete cycle of how inputs from Submitter-Users and responses from Publisher-Users are processed, refined, and published within the system.

At Step 702, the method begins by receiving one or more inputs from the Submitter-Users. These inputs correspond to the one or more selectable input fields or the one or more free text input fields present in a Target Interactive Transaction. This step represents the initial interaction of users with the Interactive Transaction system, where they provide information, answers, or data as requested by the form. The inputs could range from simple selections from predefined options to complex free-text responses, depending on the nature and purpose of the Target Interactive Transaction.

At Step 704, the method employs the Refining Module 215 to process the inputs through a sophisticated refinement pipeline. The Refining Module first uses the Artificial Intelligence Module to validate the inputs against a training dataset. The validated inputs are then passed to the Large Language Model (LLM) Module for translation into semantic triples, structuring the data in a format that captures its semantic meaning. The Semantic Reasoner Module then infers logical relationships from these triples, before the Synthesis Module consolidates all this information into a refined Interactive Transaction Submission. This multi-step refinement ensures that the data maintains its semantic richness while achieving the highest quality standards.

At Step 706, the method publishes the refined inputs on the Transaction Publishing Platform. This step makes the submitted and refined data available within the system. The Transaction Publishing Platform likely organizes and indexes the published inputs, making them easily accessible and searchable. This publication step may also trigger notifications to relevant parties, such as the Publisher-Users or other stakeholders who need to be aware of or act on the submitted information.

At Steps 708 and 710, the method handles responses from Publisher-Users through a parallel refinement process. When a Publisher-User provides a response to submitted inputs, the system applies the same sophisticated refinement pipeline: validation through the Artificial Intelligence Module, semantic translation by the Large Language Model Module, logical inference by the Semantic Reasoner Module, and final synthesis into a refined response.

This consistent application of refinement processes ensures that both submissions and responses maintain the same high standards of quality and semantic richness within the system.

At Step 712, the method concludes by publishing the refined responses on the Transaction Publishing Platform. This step makes the Publishers' feedback available within the system, completing the cycle of submission and response. The published responses become part of the system's body of knowledge, potentially informing future Interactive Transaction submissions and responses. This step may also trigger notifications to the original Submitter-Users, alerting them that a response to their submission is available.

This Interactive Transaction Submission and Response Process establishes a comprehensive framework for structured information exchange. By applying advanced refinement techniques consistently to both submissions and responses, the system ensures high-quality data and communication throughout the entire interaction cycle. The process supports multiple iterations of submission and response as needed, enabling complex workflows and detailed information gathering while maintaining semantic consistency and data quality at every step.

Furthermore, by publishing both the refined inputs and responses, the system creates a valuable repository of information. This repository can be used for analytics, to inform future Interactive Transaction design, to train machine learning models, or to provide insights for decision-making. The consistent refinement of both inputs and responses ensures that this repository contains high-quality, standardized data, maximizing its potential value.

The Interactive Transaction Submission and Response Process, as illustrated in FIG. 7, forms a core component of the overall System 101. It enables sophisticated, bi-directional communication between Submitters and Publishers, all mediated and enhanced by the system's advanced processing capabilities. This process supports a wide range of applications, from simple data collection to complex, multi-stage approval workflows, adapting to the specific needs of each implemented Interactive Transaction.

Figure 8:
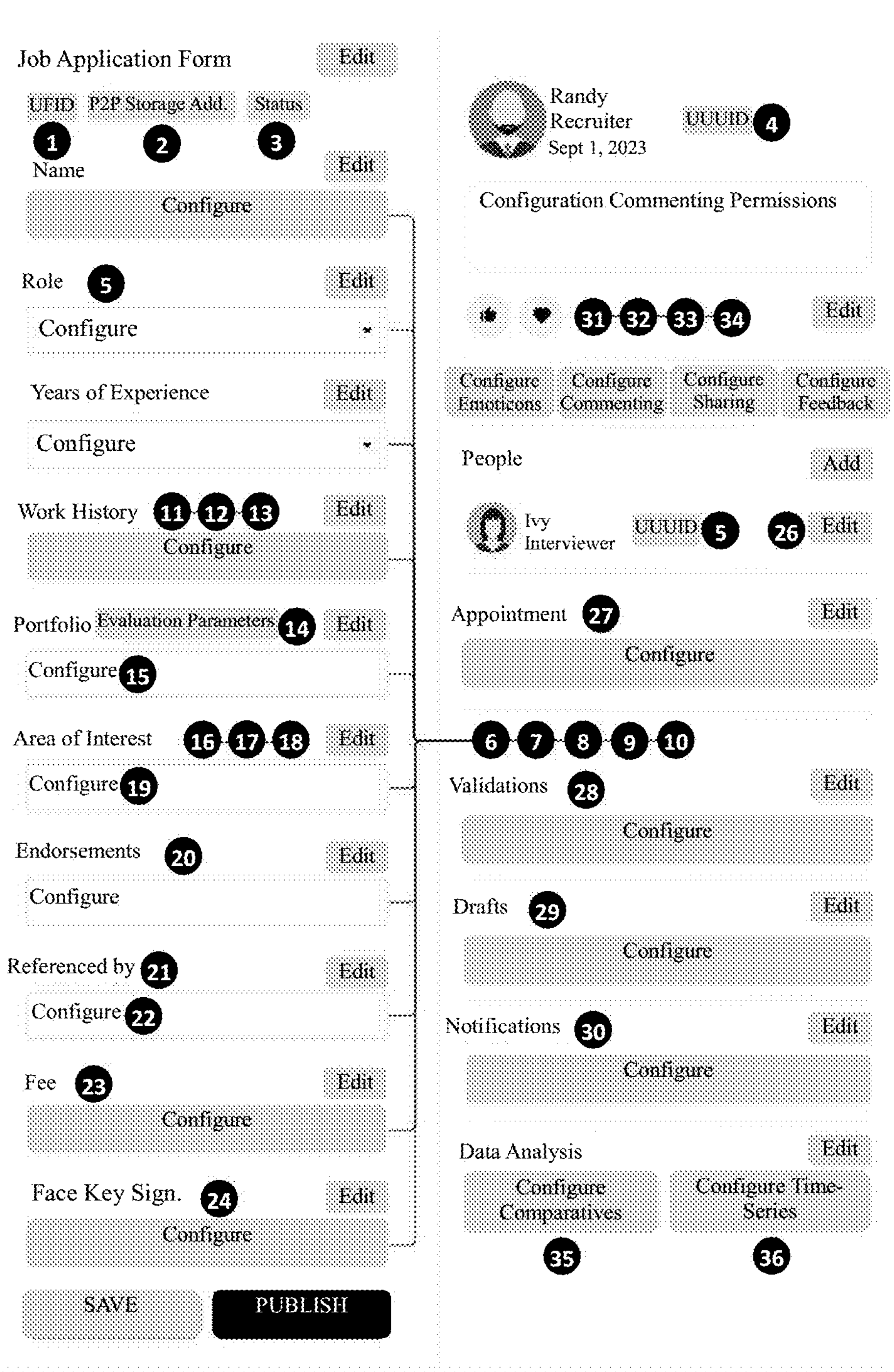
FIGS. 8, 9, and 10 illustrates a Publisher-Interface and a Submitter-Interface, in accordance with an embodiment of the present disclosure.
Figure 9:
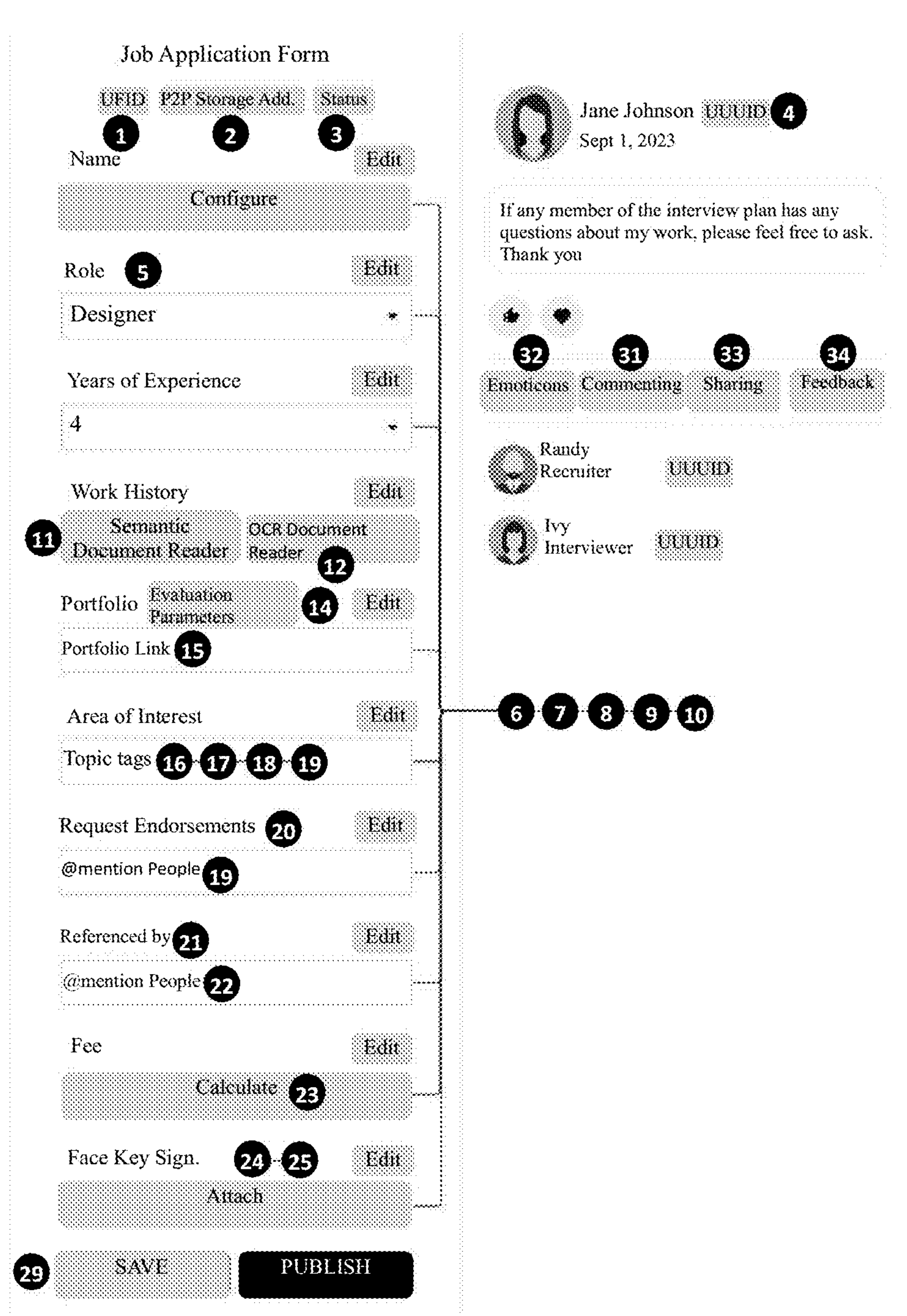
Figure 10:
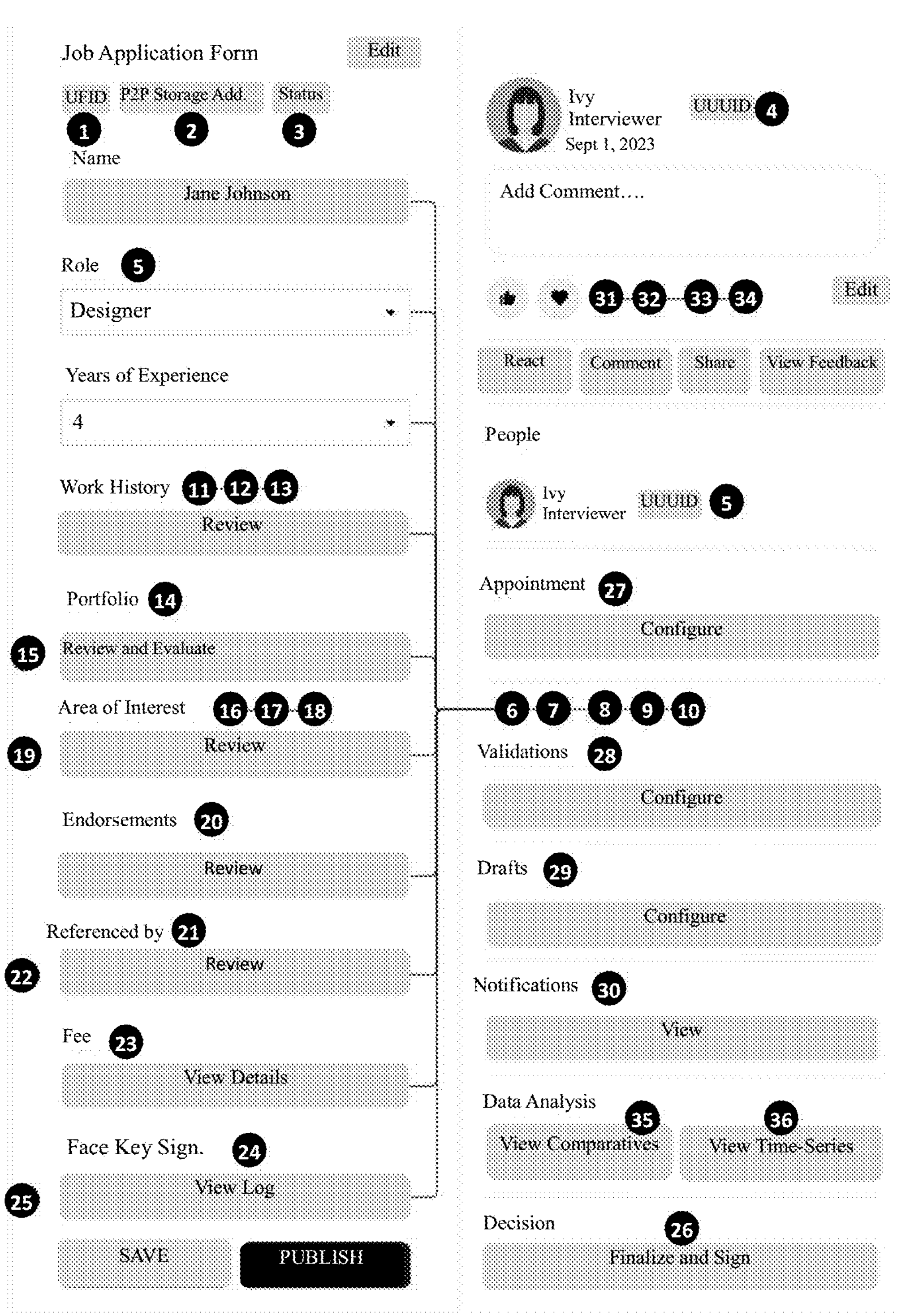

FIGS. 8, 9, and 10 illustrates a Publisher-Interface and a Submitter-Interface, in accordance with an embodiment of the present disclosure. These interfaces implement the Interactive Transaction Framework's user interaction components, providing specialized environments for Publisher-Users and Submitter-Users to interact with the system.

The Universal Transaction ID (1) represents a unique identifier assigned to each Interactive Transaction within the system 101, ensuring efficient tracking and management across the platform.

The Peer-to-peer network storage (2) refers to a decentralized method of storing Interactive Transaction data across multiple user devices, enhancing data resilience and accessibility.

Form status settings (3) are configurable options that indicate the current state of an Interactive Transaction within its lifecycle, implementing the Transaction States defined in the ontology including draft, pending, or approved states.

The current user's SelfKey based anonymous Universal Unique User ID (4) represents a unique identifier derived from the user's biometric data through the Function (F1) cryptographic process, ensuring anonymity while maintaining consistent identity verification across the system.

The list of SelfKey based anonymous Universal Unique User IDs with Interactive Transaction permissions (5) comprises a collection of identity tokens and associated access rights. Each identity token is derived from a user's PublicKey and enables authenticated interactions while preserving user privacy, allowing for secure transaction processing without exposing actual user identities or biometric information.

The Graph Database (6) is a database that uses graph structures with nodes, edges, and properties to represent and store data, allowing for complex relationships to be mapped and queried efficiently.

JSON parameters (7) are data structures used to define and configure various aspects of Interactive Transactions in a format that is both human-readable and machine-parsable.

API endpoints (8) are specific URLs that accept web service requests and serve as connection points for accessing various functionalities of the System 101.

The rules composer (9) is a tool within the system that allows users to create and manage logical conditions and actions that govern Interactive Transaction behavior and data validation.

Configurable workflow actions (10) are customizable sequences of operations that can be defined to automate processes within the System 101.

The semantic document reader (11) is a component that interprets and extracts meaningful information from structured documents, understanding their context and content.

The OCR document reader (12) is a tool that uses Optical Character Recognition technology to convert images of text into machine-encoded text, facilitating the import of data from physical documents.

The Large Language Model (13) is an advanced AI model capable of understanding and generating human-like text, used for natural language processing tasks within the system.

Parametric evaluation settings (14) are configurable criteria used to assess and analyze Interactive Transaction inputs based on predefined parameters.

Attachment links (15) are mechanisms for associating external files or documents with specific Interactive Transactions or Transaction fields.

Topic tags (16) are labels used to categorize and organize Interactive Transactions based on their subject matter or purpose.

The RDF Triple store (17) is a specialized database for the storage and retrieval of triples, which are data entities composed of subject-predicate-object relationships.

The Knowledge Graph (18) is a network of entities, their properties, and the relationships between them, used to represent and organize complex information within the system.

Contextual links (19) are hyperlinks or references that provide additional, context-specific information relevant to particular Transaction fields or topics.

Endorsement settings (20) are configurable options that allow users to support or verify information provided by other users within the system.

Referral settings (21) are options that enable users to recommend or direct other users to specific Interactive Transactions or system features.

@mention settings (22) are configuration options for a feature that allows users to reference or notify other users within the system using their unique identifiers.

The fee calculator (23) is a tool within the system that computes charges or costs associated with specific Interactive Transaction submissions or processes.

The SelfKey signature (24) implements a biometric-based digital signature system that uses the cryptographic framework established during user registration to verify the identity of users signing forms.

SelfKey based secure access (25) leverages the biometric authentication process defined in the claims to grant system access, ensuring consistent and secure user verification across all system interactions.

Multi-signature settings (26) are options for configuring workflows that require approval or signature from multiple users, either in sequence or simultaneously.

Appointment tool settings (27) are configuration options for scheduling and managing meetings or time slots within the system.

Validator settings (28) are configurable rules and conditions used to check the accuracy, completeness, and consistency of data entered into Interactive Transactions.

Draft settings (29) are options that allow users to save incomplete forms and continue working on them at a later time.

Notification settings (30) are configurable options for alerting users about form-related events, updates, or required actions.

Configurable commenting permissions (31) are settings that control who can add, view, or respond to comments on Interactive Transactions.

Emoticon settings (32) are options for enabling and customizing the use of emotion-expressing icons within the system.

Sharing settings (33) are configurable options that determine how and with whom Interactive Transactions can be shared within the system.

Feedback settings (34) are options for configuring how users can provide and receive input on the quality or effectiveness of Interactive Transactions.

Comparative data analytics (35) are tools and features that allow users to analyze and compare data across multiple Interactive Transactions or time periods.

Time-series data analytics (36) are capabilities within the system for analyzing and visualizing data that changes over time, extracted from Interactive Transactions. These features collectively provide a comprehensive toolset for creating, managing, and analyzing Interactive Transactions within the system.

Although implementations for the system 101 and the method 300 for managing Interactive Transactions, have been described in language specific to structural features and methods, it must be understood that the claims are not limited to the specific features or methods described. Rather, the specific features and methods are disclosed as examples of implementations for the system 101 and the method 300 for managing Interactive Transactions.

The invention claimed is:

1. A system for providing Interactive Transaction Frameworks, the system comprising:

a processor;

a memory coupled to the processor, wherein the processor is configured to execute programmed instructions stored in the memory for:

registering each user from a set of users, wherein the set of users comprises one or more Publisher-Users and one or more Submitter-Users, wherein user registration process for each user comprises steps of:

receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, and storing the Public-Key (P1) as a base identifier of the user, in a people registry;

defining, by an Ontology Module, one or more ontologies based on inputs received from developer users;

building, by a Schema Module, one or more schemas based on the one or more ontologies;

developing, by a Graph Database Module, one or more graph databases using the one or more schemas;

generating, by a Knowledge Graph Module, one or more knowledge graphs using the one or more graph databases and the one or more ontologies, wherein the Knowledge Graph Module is comprised of a set of knowledge graphs, wherein each knowledge graph, from the set of knowledge graphs, contains a set of RDF triple stores, wherein each RDF triple-store contains a set of RDF triples, wherein the Knowledge Graph Module is integrated with a Large Language Model and is configured for:

receiving training data into the Large Language Model, translating, by the Large Language Model, the training data into a set of semantic (RDF) triples, generating, by the Large Language Model, RDF queries based on the set of semantic (RDF) triples, validating, by the Semantic Reasoner Module, the internal logic of the set of semantic (RDF) triples, executing a first query to traverse across one or more triple stores, obtaining results of the first query, applying the results to formulate a second query, executing the second query to traverse across one or more triple stores, and creating a feedback loop of cascading queries and results spanning all accessible Knowledge Graphs, thereby generating a completely normalized and consistent set of Knowledge Graphs;

building, by a Preference Store Module, a preference store comprised of preferences in respect of each user from the set of users, wherein the preferences are stored in the form of RDF triples based on the one or more ontologies and the one or more schemas;

authenticating the one or more Publisher-Users and the one or more Submitter-Users based on a user authentication process, wherein the user authentication process comprises:

receiving a biometric sample captured from the user in real-time, processing the biometric sample to generate a Secret-Key (S2), fetching the Public-Key (P1) corresponding to the user from the user device based on the base identifier, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored on the user device, composing, by a Transaction Composer Module, a set of Interactive Transactions based on Transaction fields received from the one or more Publisher-Users, wherein the set of Interactive Transactions is comprised of one or more selectable input Transaction fields and optionally one or more free text input Transaction fields, wherein each of the one or more selectable input Transaction fields and optionally one or more free text input Transaction fields is mapped to one or more semantic triples based on the one or more ontologies and the one or more schemas;

maintaining, by a Transaction Library Module, the set of Interactive Transactions;

setting, by a Permission Module, one or more user permissions corresponding to each of the set of Interactive Transactions based on inputs received from the one or more Publisher-Users;

publishing, on a Transaction Publishing Platform, the set of Interactive Transactions;

providing an interface for recording one or more submission-response cycles, wherein each submission-response cycle comprises:

receiving from the one or more Submitter-Users, one or more inputs corresponding to the one or more selectable input fields or the one or more free text input fields corresponding to a Target Interactive Transaction, refining, by a Refining Module, the one or more inputs;

publishing, on the Transaction Publishing Platform, the one or more inputs, receiving from the one or more Publisher-Users, one or more responses corresponding to the one or more inputs received from the one or more Submitter-Users, refining, by a Refining Module, the one or more responses, and publishing, on the Transaction Publishing Platform, the one or more responses;

determining an outcome based on the one or more submission-response cycles; and publishing the outcome on the Transaction Publishing Platform.

2. The system of claim 1, wherein the Refining Module is configured for:

validating, by an Artificial Intelligence Module, the one or more inputs based on a training dataset;

translating, by a Large Language Model (LLM) Module, the one or more validated inputs into one or more corresponding semantic triples;

inferring, by a Semantic Reasoner Module, one or more logical inferences from the one or more corresponding semantic triples; and synthesizing, by a Synthesis Module, the one or more logical inferences to produce a refined Interactive Transaction Submission.

3. The system of claim 2, wherein the Refining Module is configured for validating, by an Artificial Intelligence Module, the one or more responses based on a training dataset;

translating, by a Large Language Model (LLM) Module, the one or more validated responses into one or more corresponding semantic triples;

inferring, by a Semantic Reasoner Module, one or more logical inferences from the one or more corresponding semantic triples; and synthesizing, by a Synthesis Module, the one or more logical inferences to produce a refined Interactive Transaction Submission Response.

4. The system of claim 1, wherein defining the one or more ontologies by the Ontology Module comprises steps of:

receiving inputs from the developer users specifying concepts, categories, properties, and relationships for each domain;

creating a hierarchical structure of objects representing the concepts and categories;

organizing the concepts, categories, properties, and relationships into one or more sets of hierarchically structured objects; and building the one or more ontologies, for use by the Schema Module, based on the one or more sets of hierarchically structured objects.

5. The system of claim 1, wherein building the one or more schemas by the Schema Module comprises steps of:

receiving the one or more ontologies from the Ontology Module;

generating a set of schemas based on the received one or more ontologies, wherein the set of schemas are maintained in a schema library; and selecting, from the schema library, a subset of schemas for use by the Graph Database Module, wherein the subset of schemas is selected based on inputs received from the one or more Publisher-Users.

6. The system of claim 1, wherein developing the one or more graph databases by the Graph Database Module comprises steps of:

receiving the subset of schemas from the Schema Module;

identifying nodes and edges based on the received subset of schemas; and creating the one or more graph databases based on the identified nodes and edges for use by the Knowledge Graph Module.

7. The system of claim 1 is further configured for using the ontologies and schemas to build semantic (RDF) triples in a subject-predicate-object structure;

storing the semantic (RDF) triples in a triplestore; and updating the triple stores based on changes in one or more ontologies or schemas.

8. The system of claim 1, wherein constructing the one or more semantic triples by a Triple store Module comprises steps of:

receiving a knowledge graph from the Knowledge Graph Module;

creating RDF triples in a subject-predicate-object structure based on the knowledge graph;

storing the created triples in a triplestore; and connecting curated data sources and regularly updating the triplestore.

9. The system of claim 8, wherein the Preference Store Module is further configured for:

receiving preferences from a target Submitter-User;

identifying from the Triple store Module, the triples corresponding to the target Submitter-User's preferences;

combining the identified triples to generate a personal-preference knowledge graph corresponding to the target Submitter-User; and offering personalized services to the target Submitter-User based on the personal-preference knowledge graph.

10. The system of claim 9, wherein the Preference Store Module is further configured for:

composing the set of Interactive Transactions comprised of one or more fields, wherein each field corresponds to a domain-specific schema element selected from the schema library;

combining the one or more knowledge graphs corresponding to the one or more Submitter-Users, to generate a domain-specific aggregated preference knowledge graph;

combining the one or more domain-specific aggregated preference knowledge graphs to obtain insights across one or more domains;

predicting market demands based on the insights; and offering one or more services based on the predicted market demands.

11. The system of claim 1, wherein the Transaction Library Module is configured for rendering a storage environment, wherein the storage environment is configured for:

hosting the set of Interactive Transactions;

assigning a unique Universal Transaction ID to each Interactive Transaction from the set of Interactive Transactions;

selecting from a superset of Transaction States from the ontology, a subset of Transaction States applicable to the Target Interactive Transaction, wherein the superset of Transaction States comprises draft, pending, and approved;

creating a list of Submitter-Users and Publisher-Users with permissions to:

access the Target Interactive Transaction and build one or more instances of the Target Interactive Transaction by a Transaction Composer Module, make submissions using the Target Interactive Transaction, and process the submissions received through the Target Interactive Transaction;

providing an interface for the Publisher-Users to receive submissions from Submitter-Users, wherein the identity of each Submitter-User is represented by an identity token corresponding to the Submitter-User;

receiving a request from a target user to access the Target Interactive Transaction;

authenticating the target user via the user authentication process;

determining whether the target user has permission to create an instance of the Target Interactive Transaction; and providing the one or more Publisher-Users with access to the Transaction Composer Module upon successful validation of the permissions.

12. The system of claim 1, wherein the Transaction Composer Module is configured for configuring the set of Interactive Transactions for the one or more Publisher-Users and the one or more Submitter-Users by:

providing input fields, wherein each input field is mapped to a JSON parameter, wherein the JSON parameter is accessed externally via an API endpoint, wherein the Transaction Composer Module is further configured for:

providing a rules-engine for creating rules in respect of one or more fields in the set of Interactive Transactions, providing a set of configurable actions in respect of the one or more fields in the set of Interactive Transactions, and providing an interface to build a workflow comprised of the one or more fields, one or more rules in respect of the one or more fields, and one or more actions.

13. The system of claim 1, wherein the system is configured for:

providing an interface to the one or more Publisher-Users for configuring parametric evaluation of one or more input values provided by the one or more Submitter-Users;

providing an interface to the one or more Submitter-Users for submitting input values corresponding to one or more fields subject to parametric evaluations;

providing an interface to the one or more Publisher-Users for recording parametric evaluation responses;

providing an interface to the one or more Submitter-Users and the one or more Publisher-Users for inserting, in the Target Interactive Transaction, contextual links such as open-source articles;

providing an interface to the one or more Publisher-Users for configuring endorsement settings, wherein the endorsement settings provision the one or more Submitter-Users to @mention people and request them for an endorsement or a referral, wherein the @mentioned people then add their endorsement or referral, wherein the endorsement or referral is appended to the one or more Submitter-User's submission of the Target Interactive Transaction;

providing an interface for the one or more Submitter-Users to automatically fill in the input fields in the Target Interactive Transaction using the data stored in the one or more Submitter-User's Personal Data Vault;

providing an interface for one or more Submitter-Users to calculate fees;

providing an interface to the one or more Publisher-Users and the one or more Submitter-Users to capture their key based signature and attach it to the Target Interactive Transaction; and authenticating users using their key and upon successful authentication, providing the users the requested access to the Transaction Composer Module.

14. The system of claim 1, wherein the system is further configured for:

providing an interface to facilitate workflows requiring multiple signatures, whether in a particular order or in parallel;

providing an interface for appointment setting;

providing a mechanism for validating the values entered by users;

providing an interface to allow users to save a draft of the Target Interactive Transaction and access it later;

providing notifications to users based on the configuration;

providing an interface to users for configuring, adding, and managing comments, emoticons, GIFs, and other expressive elements on the Target Interactive Transaction; and providing an interface to users for performing and viewing analytics related to Interactive Transactions based on a Interactive Transaction Framework.

15. A method for providing Interactive Transaction Frameworks, the method comprising steps of:

registering each user from a set of users, wherein the set of users comprises one or more Publisher-Users and one or more Submitter-Users, wherein user registration process for each user comprises steps of:

receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, and storing the Public-Key (P1) as a base identifier of the user, in a people registry;

defining, by an Ontology Module, one or more ontologies based on inputs received from developer users;

building, by a Schema Module, one or more schemas based on the one or more ontologies;

developing, by a Graph Database Module, one or more graph databases using the one or more schemas;

generating, by a Knowledge Graph Module, one or more knowledge graphs using the one or more graph databases and the one or more ontologies, wherein the Knowledge Graph Module is comprised of a set of knowledge graphs, wherein each knowledge graph, from the set of knowledge graphs, contains a set of RDF triple stores, wherein each RDF triplestore contains a set of RDF triples, wherein the Knowledge Graph Module is integrated with a Large Language Model and is configured for:

receiving training data into the Large Language Model, translating, by the Large Language Model, the training data into a set of semantic (RDF) triples, generating, by the Large Language Model, RDF queries based on the set of semantic (RDF) triples, validating, by the Semantic Reasoner Module, the internal logic of the set of semantic (RDF) triples, executing a first query to traverse across one or more triple stores, obtaining results of the first query, applying the results to formulate a second query, executing the second query to traverse across one or more triple stores, and creating a feedback loop of cascading queries and results spanning all accessible Knowledge Graphs, thereby generating a completely normalized and consistent set of Knowledge Graphs;

building, by a Preference Store Module, a preference store comprised of preferences in respect of each user from the set of users, wherein the preferences are stored in the form of RDF triples based on the one or more ontologies and the one or more schemas;

authenticating the one or more Publisher-Users and the one or more Submitter-Users based on a user authentication process, wherein the user authentication process comprises:

receiving a biometric sample captured from the user in real-time, processing the biometric sample to generate a Secret-Key (S2), fetching the Public-Key (P1) corresponding to the user from the user device based on the base identifier, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored on the user device, composing, by a Transaction Composer Module, a set of Interactive Transactions based on Transaction fields received from the one or more Publisher-Users, wherein the set of Interactive Transactions is comprised of one or more selectable input Transaction fields and optionally one or more free text input Transaction fields, wherein each of the one or more selectable input Transaction fields and optionally one or more free text input Transaction fields is mapped to one or more semantic triples based on the one or more ontologies and the one or more schemas;

maintaining, by a Transaction Library Module, the set of Interactive Transactions;

setting, by a Permission Module, one or more user permissions corresponding to each of the set of Interactive Transactions based on inputs received from the one or more Publisher-Users;

publishing, on a Transaction Publishing Platform, the set of Interactive Transactions;

providing an interface for recording one or more submission-response cycles, wherein each submission-response cycle comprises:

receiving from the one or more Submitter-Users, one or more inputs corresponding to the one or more selectable input fields or the one or more free text input fields corresponding to a Target Interactive Transaction, refining, by a Refining Module, the one or more inputs;

publishing, on the Transaction Publishing Platform, the one or more inputs, receiving from the one or more Publisher-Users, one or more responses corresponding to the one or more inputs received from the one or more Submitter-Users, refining, by a Refining Module, the one or more responses, and publishing, on the Transaction Publishing Platform, the one or more responses;

determining an outcome based on the one or more submission-response cycles; and publishing the outcome on the Transaction Publishing Platform.

16. A non-transitory computer-readable storage medium storing a computer program product comprising computer-executable instructions for providing Interactive Transaction Frameworks, which when executed by one or more processors, cause the one or more processors to perform the steps of:

registering each user from a set of users, wherein the set of users comprises one or more Publisher-Users and one or more Submitter-Users, wherein user registration process for each user comprises steps of:

receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, and storing the Public-Key (P1) as a base identifier of the user, in a people registry;

defining, by an Ontology Module, one or more ontologies based on inputs received from developer users;

building, by a Schema Module, one or more schemas based on the one or more ontologies;

developing, by a Graph Database Module, one or more graph databases using the one or more schemas;

generating, by a Knowledge Graph Module, one or more knowledge graphs using the one or more graph databases and the one or more ontologies, wherein the Knowledge Graph Module is comprised of a set of knowledge graphs, wherein each knowledge graph, from the set of knowledge graphs, contains a set of RDF triple stores, wherein each RDF triplestore contains a set of RDF triples, wherein the Knowledge Graph Module is integrated with a Large Language Model and is configured for:

receiving training data into the Large Language Model, translating, by the Large Language Model, the training data into a set of semantic (RDF) triples, generating, by the Large Language Model, RDF queries based on the set of semantic (RDF) triples, validating, by the Semantic Reasoner Module, the internal logic of the set of semantic (RDF) triples, executing a first query to traverse across one or more triple stores, obtaining results of the first query, applying the results to formulate a second query, executing the second query to traverse across one or more triple stores, and creating a feedback loop of cascading queries and results spanning all accessible Knowledge Graphs, thereby generating a completely normalized and consistent set of Knowledge Graphs;

building, by a Preference Store Module, a preference store comprised of preferences in respect of each user from the set of users, wherein the preferences are stored in the form of RDF triples based on the one or more ontologies and the one or more schemas;

authenticating the one or more Publisher-Users and the one or more Submitter-Users based on a user authentication process, wherein the user authentication process comprises:

receiving a biometric sample captured from the user in real-time, processing the biometric sample to generate a Secret-Key (S2), fetching the Public-Key (P1) corresponding to the user from the user device based on the base identifier, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored on the user device, composing, by a Transaction Composer Module, a set of Interactive Transactions based on Transaction fields received from the one or more Publisher-Users, wherein the set of Interactive Transactions is comprised of one or more selectable input Transaction fields and optionally one or more free text input Transaction fields, wherein each of the one or more selectable input Transaction fields and optionally one or more free text input Transaction fields is mapped to one or more semantic triples based on the one or more ontologies and the one or more schemas;

maintaining, by a Transaction Library Module, the set of Interactive Transactions;

setting, by a Permission Module, one or more user permissions corresponding to each of the set of Interactive Transactions based on inputs received from the one or more Publisher-Users;

publishing, on a Transaction Publishing Platform, the set of Interactive Transactions;

providing an interface for recording one or more submission-response cycles, wherein each submission-response cycle comprises:

receiving from the one or more Submitter-Users, one or more inputs corresponding to the one or more selectable input fields or the one or more free text input fields corresponding to a Target Interactive Transaction, refining, by a Refining Module, the one or more inputs;

publishing, on the Transaction Publishing Platform, the one or more inputs, receiving from the one or more Publisher-Users, one or more responses corresponding to the one or more inputs received from the one or more Submitter-Users, refining, by a Refining Module, the one or more responses, and publishing, on the Transaction Publishing Platform, the one or more responses;

determining an outcome based on the one or more submission-response cycles; and publishing the outcome on the Transaction Publishing Platform.

* * * * *